(12) United States Patent
Chong et al.

(10) Patent No.: US 8,964,853 B2
(45) Date of Patent: *Feb. 24, 2015

(54) MULTI-METRIC FILTERING

(75) Inventors: In Suk Chong, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 13/401,685

(22) Filed: Feb. 21, 2012

(65) Prior Publication Data

US 2012/0213293 A1 Aug. 23, 2012

Related U.S. Application Data

(60) Provisional application No. 61/445,967, filed on Feb. 23, 2011, provisional application No. 61/448,771, filed on Mar. 3, 2011, provisional application No. 61/473,713, filed on Apr. 8, 2011, provisional application No. 61/476,260, filed on Apr. 16, 2011, provisional application No. 61/478,287, filed on Apr. 22, 2011, provisional application No. 61/503,426, filed on Jun. 30, 2011, provisional application No. 61/503,434, filed on Jun. 30, 2011, provisional application No. 61/503,440, filed on Jun. 30, 2011, provisional application No. 61/527,463, filed on Aug. 25, 2011, provisional application No. 61/531,571, filed on Sep. 6, 2011.

(51) Int. Cl.
*H04N 7/26* (2006.01)
*H04N 19/14* (2014.01)
(Continued)

(52) U.S. Cl.
CPC ... *H04N 19/00157* (2013.01); *H04N 19/00066* (2013.01); *H04N 19/00884* (2013.01); *H04N 19/00278* (2013.01); *H04N 19/00478* (2013.01); *H04N 19/00781* (2013.01); *H04N 19/00903* (2013.01); *H04N 19/00896* (2013.01); *H04N 19/00303* (2013.01); *H04N 19/00545* (2013.01); *H04N 7/26255* (2013.01)
USPC .................................. 375/240.24; 375/240.02

(58) Field of Classification Search
None
See application file for complete search history.

(56) References Cited

U.S. PATENT DOCUMENTS 4,974,065 A 11/1990 Murakami et al.
5,610,729 A 3/1997 Nakajima
(Continued)

FOREIGN PATENT DOCUMENTS

EP 1033883 A1 9/2000
EP 1408697 A1 4/2004
(Continued)

OTHER PUBLICATIONS

List et al, "Adaptive Deblocking Filter", Jul. 2003, IEEE Transactions on Circuits and Systems for Video Technology, p. 614-619, vol. 13, No. 7.*

(Continued)

*Primary Examiner* — Sath V Perungavoor
*Assistant Examiner* — Janese Duley
(74) *Attorney, Agent, or Firm* — Shumaker & Sieffert, P.A.

(57) ABSTRACT

A filter unit of a video encoder or video decoder can determine a first metric for a group of pixels within a block of pixels based on a comparison of a subset of the pixels in the block to other pixels in the block; determine a filter based on the first metric; and generate a filtered image by applying the filter to the group of pixels. The subset of pixels can be selected to not include pixels on the boundary of the block of pixels.

44 Claims, 15 Drawing Sheets

(51) Int. Cl.
*H04N 19/117* (2014.01)
*H04N 19/70* (2014.01)
*H04N 19/176* (2014.01)
*H04N 19/42* (2014.01)
*H04N 19/61* (2014.01)
*H04N 19/85* (2014.01)
*H04N 19/82* (2014.01)
*H04N 19/182* (2014.01)
*H04N 19/46* (2014.01)

(56) References Cited

U.S. PATENT DOCUMENTS

| | | | |
|---|---|---|---|
| 5,798,795 A | 8/1998 | Glenn et al. | |
| 5,930,397 A | 7/1999 | Tsujii et al. | |
| 6,370,279 B1 | 4/2002 | Paik | |
| 6,504,872 B1 | 1/2003 | Fimoff et al. | |
| 6,983,079 B2* | 1/2006 | Kim | 382/275 |
| 7,003,038 B2 | 2/2006 | Divakaran et al. | |
| 7,076,114 B2 | 7/2006 | Westerman | |
| 7,203,234 B1 | 4/2007 | Zeng | |
| 7,289,154 B2* | 10/2007 | Gindele | 348/364 |
| 7,391,812 B2* | 6/2008 | Pun et al. | 375/240.29 |
| 7,453,938 B2 | 11/2008 | Haskell et al. | |
| 7,460,596 B2 | 12/2008 | Kwon et al. | |
| 7,702,013 B2 | 4/2010 | Schwarz et al. | |
| 7,809,207 B2 | 10/2010 | Dumitras et al. | |
| 7,894,524 B2 | 2/2011 | Demos | |
| 7,903,179 B2 | 3/2011 | Morino | |
| 7,916,965 B2 | 3/2011 | Chiu et al. | |
| 2001/0023454 A1 | 9/2001 | Fitzgerald | |
| 2003/0026495 A1 | 2/2003 | Gondek et al. | |
| 2003/0117585 A1 | 6/2003 | Lee | |
| 2003/0169931 A1 | 9/2003 | Lainema | |
| 2004/0161035 A1 | 8/2004 | Wedi | |
| 2006/0028562 A1 | 2/2006 | Schmitz et al. | |
| 2006/0095612 A1 | 5/2006 | Fitzgerald | |
| 2006/0193529 A1 | 8/2006 | Boon et al. | |
| 2006/0268990 A1 | 11/2006 | Lin et al. | |
| 2006/0285597 A1 | 12/2006 | Gupta et al. | |
| 2006/0294171 A1 | 12/2006 | Bossen et al. | |
| 2007/0053373 A1 | 3/2007 | Fitzgerald et al. | |
| 2007/0064798 A1 | 3/2007 | Paniconi et al. | |
| 2007/0140574 A1 | 6/2007 | Yamaguchi et al. | |
| 2007/0165282 A1 | 7/2007 | Sambongi et al. | |
| 2007/0230565 A1 | 10/2007 | Tourapis et al. | |
| 2008/0019605 A1 | 1/2008 | Yea et al. | |
| 2008/0024513 A1 | 1/2008 | Raveendran | |
| 2008/0063085 A1 | 3/2008 | Wu et al. | |
| 2008/0240559 A1* | 10/2008 | Malvar | 382/167 |
| 2009/0022220 A1 | 1/2009 | Vatis et al. | |
| 2009/0086816 A1 | 4/2009 | Leontaris et al. | |
| 2009/0257668 A1 | 10/2009 | Ye et al. | |
| 2009/0290637 A1 | 11/2009 | Lai et al. | |
| 2010/0008430 A1 | 1/2010 | Karczewicz et al. | |
| 2010/0014763 A1 | 1/2010 | Wittmann et al. | |
| 2010/0023336 A1 | 1/2010 | Shmunk | |
| 2010/0053415 A1 | 3/2010 | Yun | |
| 2010/0092100 A1 | 4/2010 | Madnani | |
| 2010/0104027 A1 | 4/2010 | Youn et al. | |
| 2010/0142844 A1 | 6/2010 | Pereira et al. | |
| 2010/0177822 A1 | 7/2010 | Karczewicz et al. | |
| 2010/0220788 A1 | 9/2010 | Wittmann et al. | |
| 2010/0284458 A1* | 11/2010 | Andersson et al. | 375/240.03 |
| 2010/0284461 A1 | 11/2010 | Andersson et al. | |
| 2011/0026599 A1 | 2/2011 | Andersson et al. | |
| 2011/0274158 A1 | 11/2011 | Fu et al. | |

FOREIGN PATENT DOCUMENTS

| | | | |
|---|---|---|---|
| EP | 1432249 A1 | 6/2004 | |
| EP | 1499134 A1 | 1/2005 | |
| EP | 1513349 A2 | 3/2005 | |
| EP | 1603338 A1 | 12/2005 | |
| EP | 2262267 A1 | 12/2010 | |
| JP | 61002482 A | 1/1986 | |
| JP | 2005501442 A | 1/2005 | |
| JP | 2005514872 A | 5/2005 | |
| JP | 2007506361 A | 3/2007 | |
| RU | 2295203 C2 | 3/2007 | |
| RU | 2302707 C2 | 7/2007 | |
| WO | 0154415 A1 | 7/2001 | |
| WO | 03058945 A2 | 7/2003 | |
| WO | 2005034517 A1 | 4/2005 | |
| WO | WO2006108654 A2 | 10/2006 | |
| WO | 2007111292 A1 | 10/2007 | |
| WO | WO2008038238 A2 | 4/2008 | |
| WO | 2008075247 A1 | 6/2008 | |
| WO | WO2008084378 A2 | 7/2008 | |
| WO | WO2008148272 | 12/2008 | |
| WO | 2010083438 A2 | 7/2010 | |
| WO | WO2011126759 A1 | 10/2011 | |

OTHER PUBLICATIONS

Shin et. al., "Variable block-based deblocking filter for H.264/AVC on low-end and low-bit rates terminals", Apr. 2010, Signal Processing: Image Communication, vol. 25, Issue 4, p. 255-267.*

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pages.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Gonzalez, R.C., et al., "Digital Image Processing, Chapter 10: Image Segmentation", Jan. 1, 2008, Digital Image Processing, Pearson Education, Inc, New Jersey, pp. 719-727, XP002669229, ISBN: 978-0-13-505267-9.

Gonzalez, R.C., et al., "Digital Image processing", Digital Image Processing, XX, XX, Jan. 1, 1992, pp. 189-201, XP002955339.

Gonzalez, R.C., et al., "Digital Image Processing, Image Enhancement in the Spatial Domain", Jan. 1, 2002, Digital Image Processing, Prentice-Hall, Upper Saddle River, New Jersey, pp. 128-134, XP001152050, ISBN: 978-0-201-18075-6.

International Preliminary Report on Patentability—PCT/US2012/026166, The International Bureau of WIPO—Geneva, Switzerland, Jun. 25, 2013, 20 pages.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pages.

Jahne B., Digital Image Processing, Springer-Verlag Berlin Heidelberg, 2005, 6th Edition, 654 pages total, uploaded in seven parts.

Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012], 153 pages.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pages.

Second Written Opinion from international application No. PCT/US2012/026166, dated Mar. 26, 2013, 8 pages.

Yamakage, T. et al., "Tool Experiment 10: In-loop filtering," Joint Collaborative Team on Video Coding, Document: JCTVC-B310, Jul. 21-28, 2010, 15 pp.

(56) References Cited

OTHER PUBLICATIONS

Chen, C.Y. et al., "CE8 Subset2: A Joint Proposal on Improving the Adaptive Loop Filter in TMuC0.9 by MediaTek, Qualcomm, and Toshiba", Joint Collaborative Team on Video Coding, Document: JCTVC-D119, Jan. 20-28, 2011, 18 pp.
Chujoh, T. et al., "Quadtree-Based Adaptive Loop Filter," International Telecommunication Union—Telecommunication Standardization Sector, COM16-C181-E, Jan. 2009, 4 pp.
Fu, C.M. et al., "CE8 Subset3: Picture Quadtree Adaptive Offset," Joint Collaborative Team on Video Coding, Document JCTVC-D122, Jan. 20-28, 2011, 10 pp.
Ikai, T. et al., "Region-based adaptive loop filter using two-dimensional feature," Joint Collaborative Team on Video Coding, Document JCTVC-D116, Jan. 20-28, 2011,12 pp.
International Search Report and Written Opinion of international application No. PCT/US2012/026166, dated Apr. 11, 2012, 14 pp.
Anonymous, "Advanced video coding for generic audiovisual services," International Telecommunication Union—Telecommunication Standardization Sector, H.264, Mar. 2010, 669 pp.
Chien, W.J. et al., "Adaptive Filter Based on Combination of Sum-Modified Laplacian Filter Indexing and Quadtree Partitioning," International Telecommunications Union—Telecommunications Standardization Sector, Document: VCEG-AL27, Jul. 1-8, 2009, 3 pp.
Karczewicz, M. et al., "Post-filter applicability to intra coding," International Telecommunication Union—Telecommunications Standardization Sector, Document VCEG-AH26, Jan. 9, 2008, 2 pp.
Karczewicz, M. et al., "Post-filter SEI message extensions," International Telecommunication Union—Telecommunications Standardization Sector, Document VCEG-A134, Jul. 16-18, 2008, 3 pp.
Karczewicz, M. et al., "Video coding technology proposal by Qualcomm," Joint Collaborative Team on Video Coding, Document: JCTVC-A121, Apr. 15-23, 2010, 25 pp.
Kawamura, K. et al, "Adaptive loop filtering using directional activity," Joint Collaborative Team on Video Coding, Document JCTVC-E190, Mar. 16-23, 2011, 3 pp.
Lai, W. et al., "CE8 Subtest 1: Block-based filter adaptation with features on subset of pixels," Joint Collaborative Team on Video Coding, Document JCTVC-F301, Jul. 14-22, 2011, 5 pp.
Lai, P. et al., "Loop filter with directional similarity mapping (DSM)," Joint Collaborative Team on Video Coding, Document JCTVC-D221, Jan. 20-28, 2011, 8 pp.
McCann, K. et al., "Samsung's Response to the Call for Proposals on Video Compression Technology," Joint Collaborative Team on Video, Document: JCTVC-A124, Apr. 15-23, 2010, 42 pp.
U.S. Appl. No. 13/401,548, by In Suk Chong, filed Feb. 21, 2012.
U.S. Appl. No. 13/401,573, by In Suk Chong, filed Feb. 21, 2012.
U.S. Appl. No. 13/401,552, by In Suk Chong, filed Feb. 21, 2012.
Vatis, Y. "Coding of Coefficients of two-dimensional non-separable Adaptive Wiener Interpolation Filter" Visual Communications and Image Processing, Proceedings of SPIE, vol. 5960, Jul. 2005, 9 pp.
Vatis, Y. et al., "Motion-and Aliasing-Compensated Prediction Using a Two-Dimensional Non-Separable Adaptive Wiener Interpolation Filter" IEEE International Conference on Image Processing, vol. 2, Sep. 11, 2005, 4 pp.
Wiegand, T. et al., "Overview of the H.264/AVC Video Coding Standard," IEEE Transactions on Circuits and Systems for Video Technology, vol. 13, No. 7, Jul. 2003, 17 pp.
Wittmann, S. et al. "Transmission of Post-Filter Hints for Video Coding Schemes," IEEE International Conference on Image Processing, vol. 1, 2007, 4 pp.
Chujoh et al., "Specification and experimental results of Quadtree-based Adaptive Loop Filter", ITU—Telecommunications Standardization Sector, Document VCEG-AK22 (r1), Apr. 15-18, 2009, 11 pp.
Tsai et al., "TE10 Subtest 2: Coding Unit Synchronous Picture Quadtree-based Adaptive Loop Filter", Joint Collaborative Team on Video Coding, Document: JCTVC-C143, Oct. 7-15, 2010, 12 pp.
Jahne, B., "Digital image processing," Technosphera, Moscow, 2007, pp. 331-338 (English version: 6th edition of B. Jahne, Digital image processing, Springer-Verlag Berlin Heidelberg, 2005, pp. 331-338).
Wedi T., "Adaptive Interpolation Filter for Motion Compensated Prediction", Proc. IEEE International Conference on Image Processing (ICIP), New York, vol. 2, Sep. 2002, pp. II-509-II-512.

* cited by examiner

MULTI-METRIC FILTERING

This application claims priority to
- U.S. Provisional Application No. 61/445,967, filed 23 Feb. 2011;
- U.S. Provisional Application No. 61/448,771, filed 3 Mar. 2011;
- U.S. Provisional Application No. 61/473,713, filed 8 Apr. 2011;
- U.S. Provisional Application No. 61/476,260, filed 16 Apr. 2011;
- U.S. Provisional Application No. 61/478,287, filed 22 Apr. 2011;
- U.S. Provisional Application No. 61/503,426, filed 30 Jun. 2011;
- U.S. Provisional Application No. 61/503,434, filed 30 Jun. 2011;
- U.S. Provisional Application No. 61/503,440, filed 30 Jun. 2011;
- U.S. Provisional Application No. 61/527,463, filed 25 Aug. 2011;
- U.S. Provisional Application No. 61/531,571, filed 6 Sep. 2011;

the entire contents each of which are herein incorporated by reference in their entirety.

TECHNICAL FIELD

This disclosure relates to block-based digital video coding used to compress video data and, more particularly to, techniques for the filtering of video blocks.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop computers, desktop computers, tablet computers, digital cameras, digital recording devices, video gaming devices, video game consoles, and the like. Digital video devices implement video compression techniques, such as MPEG-2, MPEG-4, or ITU-T H.264/MPEG-4, Part 10, Advanced Video Coding (AVC), to transmit and receive digital video more efficiently. Video compression techniques perform spatial and temporal prediction to reduce or remove redundancy inherent in video sequences. New video standards, such as the High Efficiency Video Coding (HEVC) standard being developed by the "Joint Collaborative Team—Video Coding" (JCTVC), which is a collaboration between MPEG and ITU-T, continue to emerge and evolve. This new HEVC standard is also sometimes referred to as H.265.

Block-based video compression techniques may perform spatial prediction and/or temporal prediction. Intra-coding relies on spatial prediction to reduce or remove spatial redundancy between video blocks within a given unit of coded video, which may comprise a video frame, a slice of a video frame, or the like. In contrast, inter-coding relies on temporal prediction to reduce or remove temporal redundancy between video blocks of successive coding units of a video sequence. For intra-coding, a video encoder performs spatial prediction to compress data based on other data within the same unit of coded video. For inter-coding, the video encoder performs motion estimation and motion compensation to track the movement of corresponding video blocks of two or more adjacent units of coded video.

A coded video block may be represented by prediction information that can be used to create or identify a predictive block, and a residual block of data indicative of differences between the block being coded and the predictive block. In the case of inter-coding, one or more motion vectors are used to identify the predictive block of data from a previous or subsequent coding unit, while in the case of intra-coding, the prediction mode can be used to generate the predictive block based on data within the CU associated with the video block being coded. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based prediction coding, the video encoder may apply transform, quantization and entropy coding processes to further reduce the bit rate associated with communication of a residual block. Transform techniques may comprise discrete cosine transforms (DCTs) or conceptually similar processes, such as wavelet transforms, integer transforms, or other types of transforms. In a discrete cosine transform process, as an example, the transform process converts a set of pixel difference values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

Filtering of video blocks may be applied as part of the encoding and decoding loops, or as part of a post-filtering process on reconstructed video blocks. Filtering is commonly used, for example, to reduce blockiness or other artifacts common to block-based video coding. Filter coefficients (sometimes called filter taps) may be defined or selected in order to promote desirable levels of video block filtering that can reduce blockiness and/or improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

SUMMARY

This disclosure describes techniques associated with filtering of video data in a video encoding and/or video decoding process. In accordance with this disclosure, filtering is applied at an encoder, and filter information is encoded in the bitstream to enable a decoder to identify the filtering that was applied at the encoder. The decoder receives encoded video data that includes the filter information, decodes the video data, and applies filtering based on the filtering information. In this way, the decoder applies the same filtering that was applied at the encoder. According to the techniques of this disclosure, on a frame-by-frame, slice-by-slice, or LCU-by-LCU basis, an encoder may select one or more sets of filters, and on a coded-unit-by-coded-unit basis, the encoder may determine whether or not to apply filtering. For the coded units (CUs) that are to be filtered, the encoder can perform filtering on a pixel-by-pixel or group-by-group basis, where a group might, for example, be a 2×2 block of pixels or a 4×4 block of pixels.

In one example, a method of video coding includes determining a first metric for a block of pixels, wherein the first metric is determined based on a comparison of a subset of the pixels in the block to other pixels in the block; based on the first metric, determining a filter for the block of pixels; and, generating a filtered image by applying the filter to the block of pixels.

In another example, a video coding device includes a filter unit configured to determine a first metric for a block of pixels, wherein the first metric is determined based on a comparison of a subset of the pixels in the block to other pixels in the block, determine a filter for the block of pixels based on the first metric, and generate a filtered image by applying the filter to the block of pixels; and a memory configured to store a filtered result of the filter unit;

In another example, a video coding apparatus includes means for determining a first metric for a block of pixels, wherein the first metric is determined based on a comparison of a subset of the pixels in the block to other pixels in the block; means for determining a filter for the block of pixels based on the first metric; and, means for generating a filtered image by applying the filter to the block of pixels.

In another example, a computer-readable storage medium stores instructions that when executed cause one or more processors to determine a first metric for a block of pixels, wherein the first metric is determined based on a comparison of a subset of the pixels in the block to other pixels in the block; determine a filter for the block of pixels based on the first metric; and, generate a filtered image by applying the filter to the block of pixels.

The details of one or more examples are set forth in the accompanying drawings and the description below. Other features, objects, and advantages will be apparent from the description and drawings, and from the claims.

DETAILED DESCRIPTION

Figure 1:
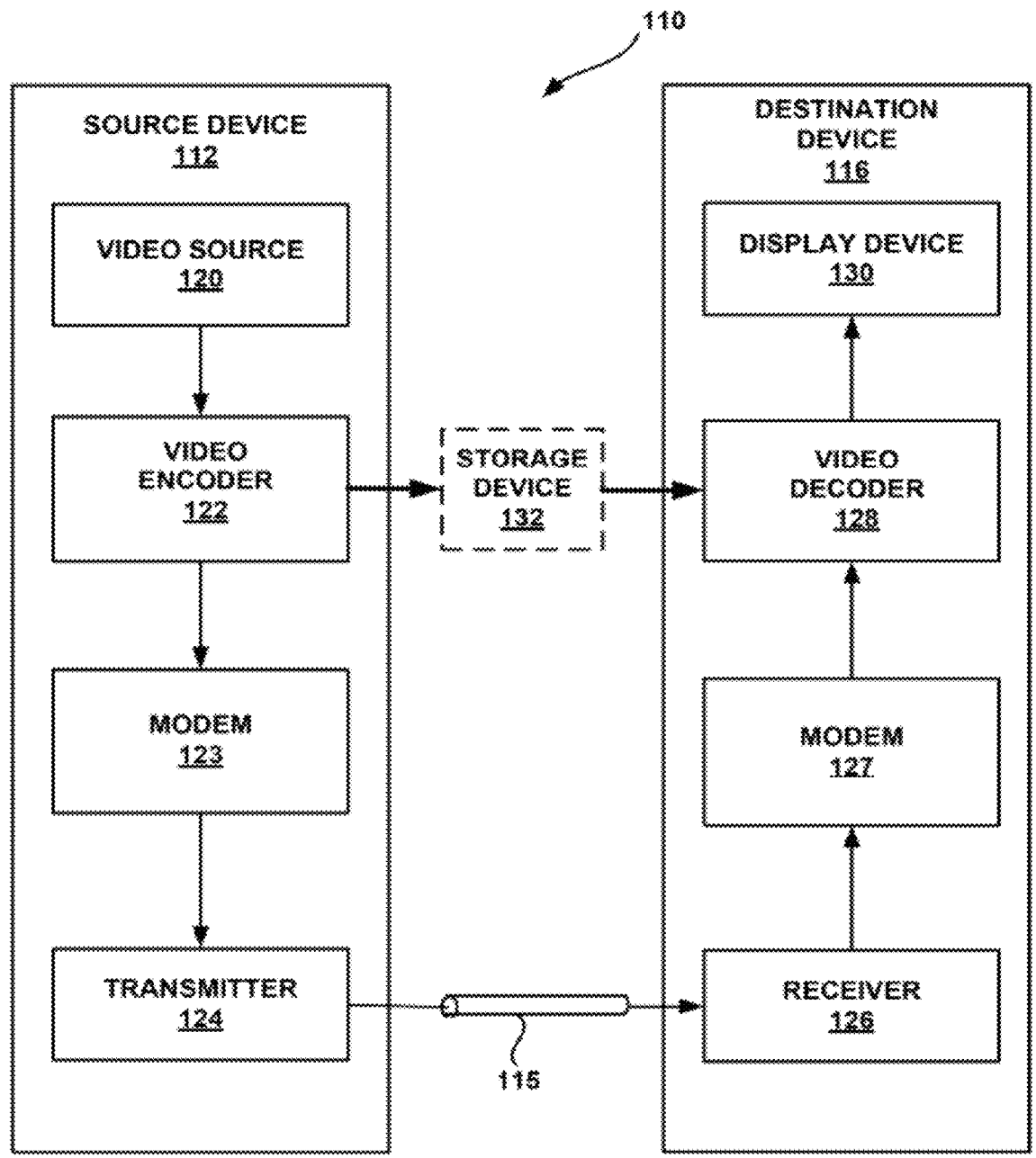
FIG. 1 is a block diagram illustrating an exemplary video encoding and decoding system.

This disclosure describes techniques associated with filtering of video data in a video encoding and/or video decoding process. In accordance with this disclosure, filtering is applied at an encoder, and filter information is encoded in the bitstream to enable a decoder to identify the filtering that was applied at the encoder. The decoder receives encoded video data that includes the filter information, decodes the video data, and applies filtering based on the filtering information. In this way, the decoder applies the same filtering that was applied at the encoder. According to the techniques of this disclosure, on a frame-by-frame, slice-by-slice, or LCU-by-LCU basis, an encoder may select one or more sets of filters, and on a coded-unit-by-coded-unit basis, the encoder may determine whether or not to apply filtering. For the coded units (CUs) that are to be filtered, the encoder can perform filtering on a pixel-by-pixel or group-by-group basis, where a group might, for example, be a 2×2 block of pixels or a 4×4 block of pixels.

According to the techniques of this disclosure, video data can be coded in units referred to as coded units (CUs). CUs can be partitioned into smaller CUs, or sub-units, using a quadtree partitioning scheme. Syntax identifying the quadtree partitioning scheme for a particular CU can be transmitted from an encoder to a decoder. Multiple inputs associated with each sub-unit of a given CU can be filtered during the process of decoding and reconstructing the encoded video data. According to the techniques of this disclosure, filter description syntax can describe a set of filters, such as how many filters are in the set or what shape the filters take. Additional syntax in the bitstream received by the decoder can identify the filters (i.e. the filter coefficients) used at the encoder for a particular sub-unit. The filter used for a particular input can be selected based on two or metrics, where certain combinations of values for the two or metrics are indexed to specific filters within a set of filters. In other instances, two or more metrics may be combined to form a single metric. The mapping of filters to metrics can also be signaled in the bitstream Different types of filtering may be applied to pixels or blocks of pixels based on two or more metrics determined for the video data. The filter used for a particular pixel can be selected based on two or more metrics, such as some combination of an activity metric and a direction metric. An activity metric, for example, may quantify activity associated with one or more blocks of pixels within the video data. The activity metric may comprise a variance metric indicative of pixel variance within a set of pixels. An activity metric may be either direction-specific or non-direction-specific. For example, a non-direction-specific activity metric may include a sum-modified Laplacian value, as explained in greater detail below.

Examples of direction-specific activity metrics include a horizontal activity metric, a vertical activity metric, a 45-degree activity metric, and a 135-degree activity metric. A direction metric may for a block of pixels quantify any of the horizontal activity, vertical activity, or diagonal activity of a pixel or group of pixels, or a direction metric may include a comparison of horizontal activity, vertical activity, and/or diagonal activity, where horizontal activity generally refers to changes in pixel values in a horizontal direction, vertical activity generally refers to changes in pixel values in a vertical direction, and diagonal activity generally refers to changes in pixel values in a diagonal direction.

According to techniques of this disclosure, when determining a filter for a block of pixels, a subset of pixels within the block may be used to reduce encoding and decoding complexity. For example, when determining a filter for a 4×4 block of pixels, it may not be necessary to use all sixteen pixels of the 4×4 block. Additionally, according to techniques of this disclosure, the subset of pixels from within a current block being coded can be selected such that the metrics are calculated only using pixel values of the current block and not pixel values of neighboring blocks. For instance, the metric for a pixel being evaluated might be calculated based on comparing the pixel to nearby pixels. In some instances, one or more of the nearby pixels for the pixel being evaluated might be in a different block than the pixel being evaluated. In other instances, however, one or more of the nearby pixels for the pixel might be in the same block as the pixel. According to techniques of this disclosure, the subset of pixels can be selected to include pixels that do not have nearby pixels in neighboring blocks. Additionally or alternatively, the subset of pixels may include pixels that have nearby pixels in neighboring blocks, but those nearby pixels in neighboring blocks may not be used when determining the metric. By basing the determination of a particular metric on pixels within a current block and not on pixels of neighboring blocks, the need for buffers at the encoder and/or decoder may, in some instances, be reduced or even eliminated.

In some instances, according to techniques of this disclosure, the subset of pixels from within a current block being coded can be selected such that the metrics are calculated only using pixel values of the current block and left and right neighboring blocks but not pixel values of upper neighboring blocks or lower neighboring blocks. As a result of the raster scan order used when coding video blocks, line buffers for upper and lower neighboring blocks tend to need to store far more pixel values than line buffers for storing pixel values of left and right neighboring blocks.

According to the techniques of this disclosure, a filter unit, such as an adaptive-in loop filter, can be configured to utilize multiple filters based on multi-metric filter mapping. The multiple filters may be used in conjunction with a single input or multiple inputs. As will be described in more detail below, the multiple inputs described in this disclosure generally refer to intermediate video block data or image data that is produced during the encoding and decoding processes. Multiple inputs associated with a given video block can include, for example, a reconstructed block or image (RI), a pre-deblocked reconstructed block or image (pRI), a prediction block or image (PI), and/or a quantized prediction error image (EI). In a single input scheme, a filter may only be applied to one of the inputs above, such as RI. Also, as explained in greater detail below, the filtering techniques of this disclosure can be applied to CUs of various sizes using a quadtree partitioning scheme. By utilizing multiple filters with multi-metric filter mapping for CUs partitioned using a quadtree partitioning scheme, video coding performance, as measured by one or both of compression rate and reconstructed video quality, might be improved.

To implement the multi-metric filtering techniques described above, an encoder maintains, by generating, updating, storing, or other means, a mapping of combinations of ranges to filters. As one example, the combination of a first range for a first metric and a first range for a second metric may map to a first filter. The combination of the first range for the first metric and a second range for the second metric may also map to the first filter or may map to a second filter. If a first metric has eight ranges and a second metric has four ranges, for example, then the first and second metric can have thirty-two combinations of ranges, and each of the thirty-two combinations can be mapped to a filter. Each combination, however, is not necessarily mapped to a unique filter. Thus, the thirty-two combinations might map to four filters, eight filters, ten filters, or some other number of filters. In order to apply the same filters as an encoder, a decoder may also maintain the same mappings of range combinations to filters.

This disclosure describes techniques for signaling from an encoder to a decoder, in an encoded bitstream, a mapping of range combinations to filters. The mapping may, for example, associate each range combination with a filter identification (ID). One simple way to signal this mapping is to use one codeword for each filter ID, and then for each combination of ranges, send the codeword of the corresponding filter ID. This technique, however, is typically inefficient. Techniques of the present disclosure may exploit correlations within the mapping by using differential coding methods. Combinations of ranges that share a common range sometimes use the same filter. As one example, the combination of a first range for a first metric and a first range for a second metric and the combination of the first range for the first metric and a second range for the second metric share a common range (the first range of the first metric). Thus, these two combinations might, in some instances, map to the same filter ID. By exploiting this correlation, the techniques of this disclosure may reduce the number of bits needed to signal the mapping of range combinations to filter IDs from an encoder to a decoder.

In addition to signaling the mapping of range combinations to filter IDs, this disclosure also describes techniques for signaling, in an encoded bitstream, filter coefficients for filters. Techniques of the present disclosure include using differential coding methods to signal filter coefficients from an encoder to a decoder. In this manner, the filter coefficients for a second filter might be communicated to a decoder as difference information, where the difference information describes how to modify the filter coefficients of a first filter in a manner that produces the filter coefficients of the second filter. Differential coding techniques may be more effective (i.e. may result in a greater savings of bits) when the filter coefficients of the first and second filter are more similar than compared to when the filter coefficients of the first and second filter are less similar. The techniques of this disclosure include determining a sequential order in which to signal filter coefficients for filters. The orderings determined using the techniques described in this disclosure may result in improved differential coding of filter coefficients, and thus, may in some instances result in a savings of bits when signaling the filter coefficients.

Although the techniques of this disclosure may at times be described in reference to in-loop filtering, the techniques may be applied to in-loop filtering, post-loop filtering, and other filtering schemes such as switched filtering. In-loop filtering generally refers to filtering in which the filtered data is part of the encoding and decoding loops such that filtered data is used for predictive intra- or inter-coding. Post-loop filtering refers to filtering that is applied to reconstructed video data after the encoding loop. With post-loop filtering, the unfiltered data, as opposed to the filtered data, is used for predictive intra- or inter-coding. In some implementations, the type of filtering may switch between post-loop filtering and in-loop filtering on, for example, a frame-by-frame, slice-by-slice, or other such basis, and the decision of whether to use post-loop filtering or in-loop filtering can be signaled from encoder to decoder for each frame, slice, etc. The techniques of this disclosure are not limited to in-loop filtering or post filtering, and may apply to a wide range of filtering applied during video coding.

In this disclosure, the term "coding" refers to encoding or decoding. Similarly, the term "coder" generally refers to any video encoder, video decoder, or combined encoder/decoder (codec). Accordingly, the term "coder" is used herein to refer to a specialized computer device or apparatus that performs video encoding or video decoding.

Additionally, in this disclosure, the term "filter" generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of more than one filter. For example, a set of two 3×3 filters, could include a first set of 9 filter coefficients and a second set of 9 filter coefficients. According to techniques described in this disclosure, for a series of video blocks, such as a frame, slice, or largest coding unit (LCU), information identifying sets of filters are signaled from the encoder to the decoder in a header for the series of the video blocks. The term "shape," sometimes called the "filter support," generally refers to the number of rows of filter coefficients and number of columns of filter coefficients for a particular filter. For example, 9×9 is an example of a first shape, 9×5 is an example of a second shape, and 5×9 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configuration.

FIG. 1 is a block diagram illustrating an exemplary video encoding and decoding system 110 that may implement techniques of this disclosure. As shown in FIG. 1, system 110 includes a source device 112 that transmits encoded video data to a destination device 116 via a communication channel 115. Source device 112 and destination device 116 may comprise any of a wide range of devices. In some cases, source device 112 and destination device 116 may comprise wireless communication device handsets, such as so-called cellular or satellite radiotelephones. The techniques of this disclosure, however, which apply more generally to filtering of video data, are not necessarily limited to wireless applications or settings, and may be applied to non-wireless devices including video encoding and/or decoding capabilities.

In the example of FIG. 1, source device 112 includes a video source 120, a video encoder 122, a modulator/demodulator (modem) 123 and a transmitter 124. Destination device 116 includes a receiver 126, a modem 127, a video decoder 128, and a display device 130. In accordance with this disclosure, video encoder 122 of source device 112 may be configured to select one or more sets of filter coefficients for multiple inputs in a video block filtering process and then encode the selected one or more sets of filter coefficients. Specific filters from the one or more sets of filter coefficients may be selected based on one or more metrics for one or more inputs, and the filter coefficients may be used to filter the one or more inputs. The filtering techniques of this disclosure are generally compatible with any techniques for coding or signaling filter coefficients in an encoded bitstream.

According to the techniques of this disclosure, a device including video encoder 122 can signal to a device including video decoder 128 one or more sets of filter coefficients for a series of video blocks, such as a frame or a slice. For the series of video blocks, video encoder 122 may, for example, signal one set of filters to be used with all inputs, or may signal multiple sets of filters to be used with multiple inputs (one set per input, for example). Each video block or CU within the series of video blocks can then contain additional syntax to identify which filter or filters of the set of the filters is to be used for each input of that video block, or in accordance with the techniques of this disclosure, which filter or filters of the set of the filters is to be used can be determined based on two or more metrics associated with one or more of the inputs.

More specifically, video encoder 122 of source device 112 may select one or more sets of filters for a series of video blocks, apply filters from the set(s) to pixels or groups of pixels of inputs associated with CUs of the series of video blocks during the encoding process, and then encode the sets of filters (i.e. sets of filter coefficients) for communication to video decoder 128 of destination device 116. Video encoder 122 may determine one or more metrics associated with inputs of CUs coded in order to select which filter(s) from the set(s) of filters to use with pixels or groups of pixels for that particular CU. Video encoder 122 may also signal to video decoder 128, as part of the coded bitstream, a mapping of combinations of ranges to filters within a set of filters.

On the decoder side, video decoder 128 may determine the filter coefficients based on filter information received in the bitstream syntax. Video decoder 128 may decode the filter coefficients based on direct decoding or predictive decoding depending upon how the filter coefficients were encoded, which may be signaled as part of the bitstream syntax. Additionally, the bitstream may include filter description syntax information to describe the filters for a set of filters. Based on the filter description syntax, decoder 128 can reconstruct the filter coefficients based on additional information received from encoder 122. The illustrated system 110 of FIG. 1 is merely exemplary. The filtering techniques of this disclosure may be performed by any encoding or decoding devices. Source device 112 and destination device 116 are merely examples of coding devices that can support such techniques. Video decoder 128 may also determine the mapping of combinations of ranges to filters based on filter information received in the bitstream syntax.

Video encoder 122 of source device 112 may encode video data received from video source 120 using the techniques of this disclosure. Video source 120 may comprise a video capture device, such as a video camera, a video archive containing previously captured video, or a video feed from a video content provider. As a further alternative, video source 120 may generate computer graphics-based data as the source video, or a combination of live video, archived video, and computer-generated video. In some cases, if video source 120 is a video camera, source device 112 and destination device 116 may form so-called camera phones or video phones. In each case, the captured, pre-captured or computer-generated video may be encoded by video encoder 122.

Once the video data is encoded by video encoder 122, the encoded video information may then be modulated by modem 123 according to a communication standard, e.g., such as code division multiple access (CDMA), frequency division multiple access (FDMA), orthogonal frequency division multiplexing (OFDM), or any other communication standard or technique, and transmitted to destination device 116 via transmitter 124. Modem 123 may include various mixers, filters, amplifiers or other components designed for signal modulation. Transmitter 124 may include circuits designed for transmitting data, including amplifiers, filters, and one or more antennas.

Receiver 126 of destination device 116 receives information over channel 115, and modem 127 demodulates the information. The video decoding process performed by video decoder 128 may include filtering, e.g., as part of the in-loop decoding or as a post filtering step following the decoding loop. Either way, the set of filters applied by video decoder 128 for a particular slice or frame may be decoded using the techniques of this disclosure. Decoded filter information may include identifying filter description syntax in the coded bitstream. If, for example, predictive coding is used for the filter coefficients, similarities between different filter coefficients may be exploited to reduce the amount of information conveyed over channel 115. In particular, a filter (i.e. a set of the filter coefficients) can be predicatively coded as difference values relative to another set of the filter coefficients associated with a different filter. The different filter may, for example, be associated with a different slice or frame. In such a case, video decoder 128 might receive an encoded bitstream comprising video blocks and filter information that identifies the different frame or slice with which the different filter is associated filter. The filter information also includes difference values that define the current filter relative to the filter of the different CU. In particular, the difference values may comprise filter coefficient difference values that define filter coefficients for the current filter relative to filter coefficients of a different filter used for a different CU.

Video decoder 128 decodes the video blocks, generates the filter coefficients, and filters the decoded video blocks based on the generated filter coefficients. Video decoder 128 can generate the filter coefficients based on filter description syntax retrieved from the bitstream. The decoded and filtered video blocks can be assembled into video frames to form decoded video data. Display device 130 displays the decoded video data to a user, and may comprise any of a variety of display devices such as a cathode ray tube (CRT), a liquid crystal display (LCD), a plasma display, an organic light emitting diode (OLED) display, or another type of display device.

Communication channel 115 may comprise any wireless or wired communication medium, such as a radio frequency (RF) spectrum or one or more physical transmission lines, or any combination of wireless and wired media. Communication channel 115 may form part of a packet-based network, such as a local area network, a wide-area network, or a global network such as the Internet. Communication channel 115 generally represents any suitable communication medium, or collection of different communication media, for transmitting video data from source device 112 to destination device 116. Again, FIG. 1 is merely exemplary and the techniques of this disclosure may apply to video coding settings (e.g., video encoding or video decoding) that do not necessarily include any data communication between the encoding and decoding devices. In other examples, data could be retrieved from a local memory, streamed over a network, or the like.

Alternatively, encoded data may be output from video encoder 122 to a storage device 132. Similarly, encoded data may be accessed from storage device 132 by video decoder 128. Storage device 132 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 132 may correspond to a file server or another intermediate storage device that may hold the encoded video generated by source device 112.

Destination device 116 may access stored video data from storage device 132 via streaming or download. The file server may be any type of server capable of storing encoded video data and transmitting that encoded video data to the destination device 116. Example file servers include a web server (e.g., for a website), an FTP server, network attached storage (NAS) devices, or a local disk drive. Destination device 116 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 132 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 110 may be configured to support one-way or two-way video transmission to support applications such as video streaming, video playback, video broadcasting, and/or video telephony.

Video encoder 122 and video decoder 128 may operate according to a video compression standard such as the ITU-T H.264 standard, alternatively referred to as MPEG-4, Part 10, Advanced Video Coding (AVC), which will be used in parts of this disclosure for purposes of explanation. However, many of the techniques of this disclosure may be readily applied to any of a variety of other video coding standards, including the newly emerging HEVC standard. Generally, any standard that allows for filtering at the encoder and decoder may benefit from various aspects of the teaching of this disclosure.

Although not shown in FIG. 1, in some aspects, video encoder 122 and video decoder 128 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 122 and video decoder 128 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 122 and video decoder 128 may be included in one or more encoders or decoders, either of which may be integrated as part of a combined encoder/decoder (CODEC) in a respective mobile device, subscriber device, broadcast device, server, or the like.

In some cases, devices 112, 116 may operate in a substantially symmetrical manner. For example, each of devices 112, 116 may include video encoding and decoding components. Hence, system 110 may support one-way or two-way video transmission between video devices 112, 116, e.g., for video streaming, video playback, video broadcasting, or video telephony.

During the encoding process, video encoder 122 may execute a number of coding techniques or steps. In general, video encoder 122 operates on video blocks within individual video frames in order to encode the video data. In one example, a video block may correspond to a macroblock or a partition of a macroblock. Macroblocks are one type of video block defined by the ITU H.264 standard and other standards. Macroblocks typically refer to 16×16 blocks of data, although the term is also sometimes used generically to refer to any video block of N×N or N×M size. The ITU-T H.264 standard supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" refers to the pixel dimensions of the block in terms of vertical and horizontal dimensions, e.g., 16×16 pixels. In general, a 16×16 block will have 16 pixels in a vertical direction and 16 pixels in a horizontal direction. Likewise, an N×N block generally has N pixels in a vertical direction and N pixels in a horizontal direction, where N represents a positive integer value. The pixels in a block may be arranged in rows and columns.

The emerging HEVC standard defines new terms for video blocks. In particular, video blocks (or partitions thereof) may be referred to as "coding units" (or CUs). With the HEVC standard, largest coded units (LCUs) may be divided into smaller CUs according to a quadtree partitioning scheme, and the different CUs that are defined in the scheme may be further partitioned into so-called prediction units (PUs). The LCUs, CUs, and PUs are all video blocks within the meaning of this disclosure. Other types of video blocks may also be used, consistent with the HEVC standard or other video coding standards. Thus, the phrase "video blocks" refers to any size of video block. Separate CUs may be included for luma components and scaled sizes for chroma components for a given pixel, although other color spaces could also be used.

Video blocks may have fixed or varying sizes, and may differ in size according to a specified coding standard. Each video frame may include a plurality of slices. Each slice may include a plurality of video blocks, which may be arranged into partitions, also referred to as sub-blocks. In accordance with the quadtree partitioning scheme referenced above and described in more detail below, an N/2×N/2 first CU may comprise a sub-block of an N×N LCU, an N/4×N/4 second CU may also comprise a sub-block of the first CU. An N/8×N/8 PU may comprise a sub-block of the second CU. Similarly, as a further example, block sizes that are less than 16×16 may be referred to as partitions of a 16×16 video block or as sub-blocks of the 16×16 video block. Likewise, for an N×N block, block sizes less than N×N may be referred to as partitions or sub-blocks of the N×N block. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Syntax data within a bitstream may define an LCU for a frame or a slice, which is a largest coding unit in terms of the number of pixels for that frame or slice. In general, an LCU or CU has a similar purpose to a macroblock coded according to H.264, except that LCUs and CUs do not have a specific size distinction. Instead, an LCU size can be defined on a frame-by-frame or slice-by-slice basis, and an LCU be split into CUs. In general, references in this disclosure to a CU may refer to an LCU of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the terms "block" and "video block" to refer to any of an LCU, CU, PU, SCU, or TU.

As introduced above, an LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). The TUs comprise the data structure that includes residual transform coefficients, which are typically quantized. In particular, following prediction using a PU, a video encoder may calculate residual values for the portion of the CU corresponding to the PU. The residual values may be transformed, quantized, scanned and stored in a TU, which may have variable sizes corresponding to the size of the transform that was performed. Accordingly, a TU is not necessarily limited to the size of a PU. Thus, TUs may be larger or smaller than corresponding PUs for the same CU. In some examples, the maximum size of a TU may be the size of the corresponding CU. Again, the TUs may comprise the data structures that include the residual transform coefficients associated with a given CU.

Figure 2A:
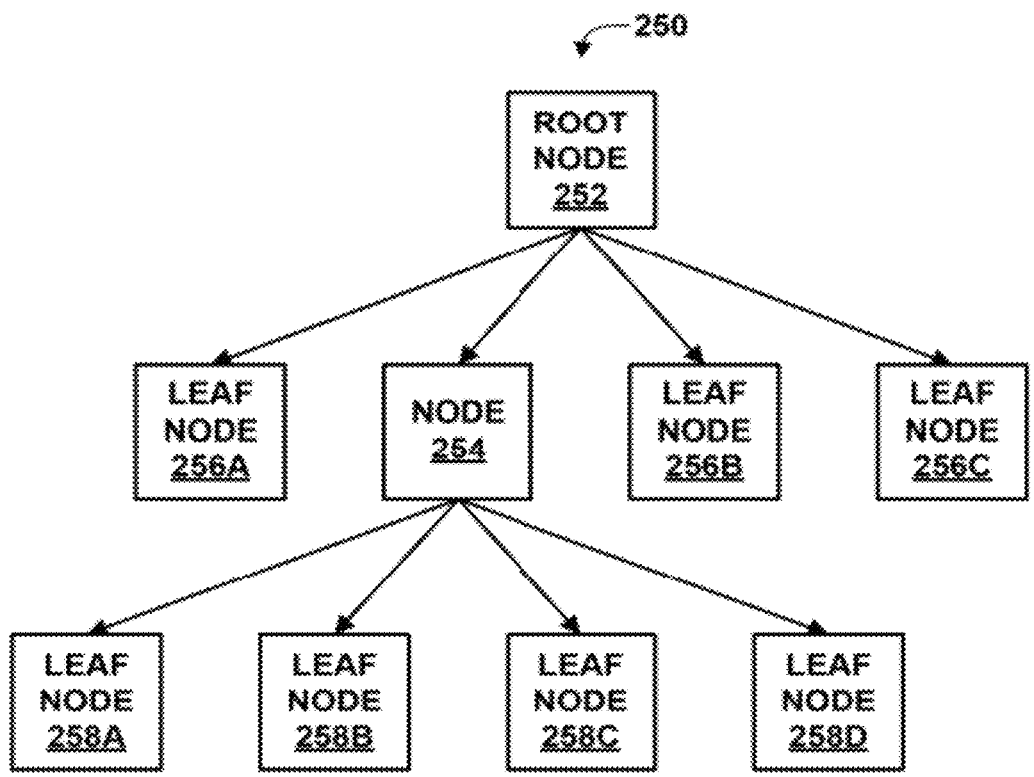
FIGS. 2A and 2B are conceptual diagrams illustrating an example of quadtree partitioning applied to a largest coding unit (LCU).
Figure 2B:
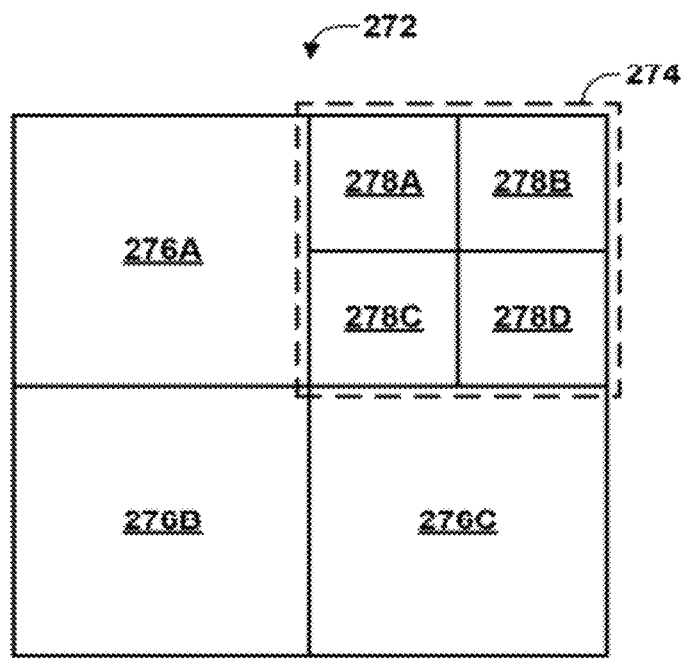

FIGS. 2A and 2B are conceptual diagrams illustrating an example quadtree 250 and a corresponding LCU 272. FIG. 2A depicts an example quadtree 250, which includes nodes arranged in a hierarchical fashion. Each node in a quadtree, such as quadtree 250, may be a leaf node with no children, or have four child nodes. In the example of FIG. 2A, quadtree 250 includes root node 252. Root node 252 has four child nodes, including leaf nodes 256A-256C (leaf nodes 256) and node 254. Because node 254 is not a leaf node, node 254 includes four child nodes, which in this example, are leaf nodes 258A-258D (leaf nodes 258).

Quadtree 250 may include data describing characteristics of a corresponding LCU, such as LCU 272 in this example. For example, quadtree 250, by its structure, may describe splitting of the LCU into sub-CUs. Assume that LCU 272 has a size of 2N×2N. LCU 272, in this example, has four sub-CUs 276A-276C (sub-CUs 276) and 274, each of size N×N. Sub-CU 274 is further split into four sub-CUs 278A-278D (sub-CUs 278), each of size N/2×N/2. The structure of quadtree 250 corresponds to the splitting of LCU 272, in this example. That is, root node 252 corresponds to LCU 272, leaf nodes 256 correspond to sub-CUs 276, node 254 corresponds to sub-CU 274, and leaf nodes 258 correspond to sub-CUs 278.

Data for nodes of quadtree 250 may describe whether the CU corresponding to the node is split. If the CU is split, four additional nodes may be present in quadtree 250. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 250, an array of split flag values may be 101000000.

In some examples, each of sub-CUs 276 and sub-CUs 278 may be intra-prediction encoded using the same intra-prediction mode. Accordingly, video encoder 122 may provide an indication of the intra-prediction mode in root node 252. Moreover, certain sizes of sub-CUs may have multiple possible transforms for a particular intra-prediction mode. Video encoder 122 may provide an indication of the transform to use for such sub-CUs in root node 252. For example, sub-CUs of size N/2×N/2 may have multiple possible transforms available. Video encoder 122 may signal the transform to use in root node 252. Accordingly, video decoder 128 may determine the transform to apply to sub-CUs 278 based on the intra-prediction mode signaled in root node 252 and the transform signaled in root node 252.

As such, video encoder 122 need not signal transforms to apply to sub-CUs 276 and sub-CUs 278 in leaf nodes 256 and leaf nodes 258, but may instead simply signal an intra-prediction mode and, in some examples, a transform to apply to certain sizes of sub-CUs, in root node 252, in accordance with the techniques of this disclosure. In this manner, these techniques may reduce the overhead cost of signaling transform functions for each sub-CU of an LCU, such as LCU 272.

In some examples, intra-prediction modes for sub-CUs 276 and/or sub-CUs 278 may be different than intra-prediction modes for LCU 272. Video encoder 122 and video decoder 128 may be configured with functions that map an intra-prediction mode signaled at root node 252 to an available intra-prediction mode for sub-CUs 276 and/or sub-CUs 278. The function may provide a many-to-one mapping of intra-prediction modes available for LCU 272 to intra-prediction modes for sub-CUs 276 and/or sub-CUs 278.

Figure 2C:
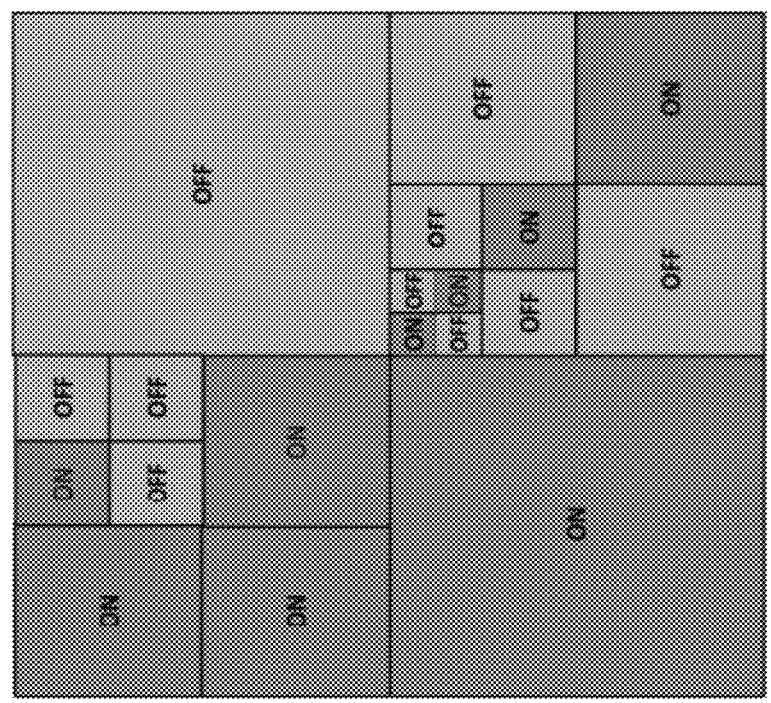
FIGS. 2C and 2D are conceptual diagrams illustrating an example of a filter map for a series of video blocks corresponding to the example quadtree partitioning of FIGS. 2A and 2B.
Figure 2D:
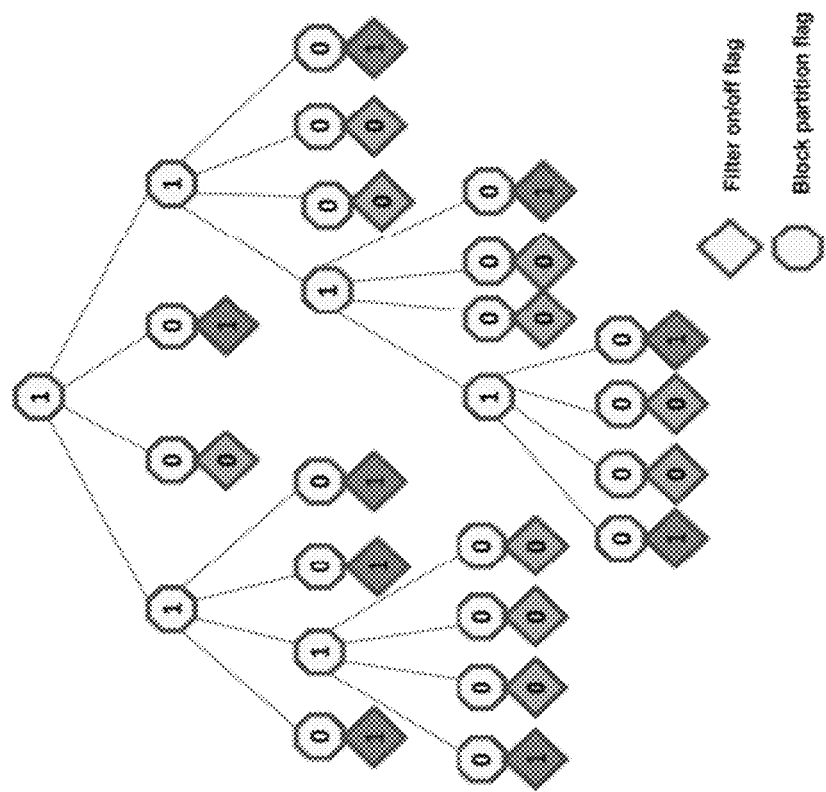

A slice may be divided into video blocks (or LCUs) and each video block may be partitioned according to the quadtree structure described in relation to FIGS. 2A-B. Additionally, as shown in FIG. 2C, the quadtree sub-blocks indicated by "ON" may be filtered by loop filters described herein, while quadtree sub-blocks indicated by "OFF" may not be filtered. The decision of whether or not to filter a given block or sub-block may be determined at the encoder by comparing the filtered result and the non-filtered result relative to the original block being coded. FIG. 2D is a decision tree representing partitioning decisions that results in the quadtree partitioning shown in FIG. 2C. The actual filtering applied to any pixels for "ON" blocks, may be determined based on the metrics discussed herein.

In particular, FIG. 2C may represent a relatively large video block that is partitioned according to a quadtree portioning scheme into smaller video blocks of varying sizes. Each video block is labelled (on or off) in FIG. 2C, to illustrate whether filtering should be applied or avoided for that video block. The video encoder may define this filter map by comparing filtered and unfiltered versions of each video block to the original video block being coded.

Again, FIG. 2D is a decision tree corresponding to partitioning decisions that result in the quadtree partitioning shown in FIG. 2C. In FIG. 2D, each circle may correspond to a CU. If the circle includes a "1" flag, then that CU is further partitioned into four more CUs, but if the circle includes a "0" flag, then that CU is not partitioned any further. Each circle (e.g., corresponding to CUs) also includes an associated diamond. If the flag in the diamond for a given CU is set to 1, then filtering is turned "ON" for that CU, but if the flag in the diamond for a given CU is set to 0, then filtering is turned off. In this manner, FIGS. 2C and 2D may be individually or collectively viewed as a filter map that can be generated at an encoder and communicated to a decoder at least once per slice of encoded video data in order to communicate the level of quadtree partitioning for a given video block (e.g., an LCU) whether or not to apply filtering to each partitioned video block (e.g., each CU within the LCU).

Smaller video blocks can provide better resolution, and may be used for locations of a video frame that include high levels of detail. Larger video blocks can provide greater coding efficiency, and may be used for locations of a video frame that include a low level of detail. A slice may be considered to be a plurality of video blocks and/or sub-blocks. Each slice may be an independently decodable series of video blocks of a video frame. Alternatively, frames themselves may be decodable series of video blocks, or other portions of a frame may be defined as decodable series of video blocks. The term "series of video blocks" may refer to any independently decodable portion of a video frame such as an entire frame, a slice of a frame, a group of pictures (GOP) also referred to as a sequence, or another independently decodable unit defined according to applicable coding techniques. Aspects of this disclosure might be described in reference to frames or slices, but such references are merely exemplary. It should be understood that generally any series of video blocks may be used instead of a frame or a slice.

Syntax data may be defined on a per-coded-unit basis such that each CU includes associated syntax data. The filter information described herein may be part of such syntax for a CU, but might more likely be part of syntax for a series of video blocks, such as a frame, a slice, a GOP, LCU, or a sequence of video frames, instead of for a CU. The syntax data can indicate the set or sets of filters to be used with CUs of the slice or frame. Additionally, not all filter information necessarily has to be included in the header of a common series of video blocks. For example, filter description syntax might be transmitted in a frame header, while other filter information is signaled in a header for an LCU.

Video encoder 122 may perform predictive coding in which a video block being coded is compared to a predictive frame (or other CU) in order to identify a predictive block. The differences between the current video block being coded and the predictive block are coded as a residual block, and prediction syntax is used to identify the predictive block. The residual block may be transformed and quantized. Transform techniques may comprise a DCT process or conceptually similar process, integer transforms, wavelet transforms, or other types of transforms. In a DCT process, as an example, the transform process converts a set of pixel values into transform coefficients, which may represent the energy of the pixel values in the frequency domain. Quantization is typically applied to the transform coefficients, and generally involves a process that limits the number of bits associated with any given transform coefficient.

Following transform and quantization, entropy coding may be performed on the quantized and transformed residual video blocks. Syntax elements, such as the filter information and prediction vectors defined during the encoding, may also be included in the entropy coded bitstream for each CU. In general, entropy coding comprises one or more processes that collectively compress a sequence of quantized transform coefficients and/or other syntax information. Scanning techniques, such as zig-zag scanning techniques, are performed on the quantized transform coefficients, e.g., as part of the entropy coding process, in order to define one or more serialized one-dimensional vectors of coefficients from two-dimensional video blocks. Other scanning techniques, including other scan orders or adaptive scans, may also be used, and possibly signaled in the encoded bitstream. In any case, the scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded in order to generate the video data used for subsequent prediction-based coding of subsequent video blocks. At this stage, filtering may be performed in order to improve video quality, and e.g., remove blockiness artifacts from decoded video. The filtered data may be used for prediction of other video blocks, in which case the filtering is referred to as "in-loop" filtering. Alternatively, prediction of other video blocks may be based on unfiltered data, in which case the filtering is referred to as "post filtering."

On a frame-by-frame, slice-by-slice, or LCU-by-LCU basis, video encoder 122 may select one or more sets of filters, and on a coded-unit-by-coded-unit basis, the encoder may determine whether or not to apply filtering. For the CUs that are to be filtered, the encoder can perform filtering on a pixel-by-pixel or group-by-group basis, where a group might, for example, be a 2×2 block of pixels or a 4×4 block of pixels. These selections can be made in a manner that promotes the video quality. Such sets of filters may be selected from predefined sets of filters, or may be adaptively defined to promote video quality. As an example, video encoder 122 may select or define several sets of filters for a given frame or slice such that different filters are used for different pixels or groups of pixels of CUs of that frame or slice. In particular, for each input associated with a CU, several sets of filter coefficients may be defined, and the two or more metrics associated with the pixels of the CU may be used to determine which filter from the set of filters to use with such pixels or groups of pixels.

In some cases, video encoder 122 may apply several sets of filter coefficients and select one or more sets that produce the best quality video in terms of amount of distortion between a coded block and an original block, and/or the highest levels of compression. In any case, once selected, the set of filter coefficients applied by video encoder 122 for each CU may be encoded and communicated to video decoder 128 of destination device 118 so that video decoder 128 can apply the same filtering that was applied during the encoding process for each given CU.

When two or more metrics are used for determining which filter to use with a particular input for a CU, the selection of the filter for that particular CU does not necessarily need to be communicated to video decoder 128. Instead, video decoder 128 can also calculate the two or more metrics, and based on filter information previously provided by video encoder 122, match the combination of two or more metrics to a particular filter.

Figure 3:
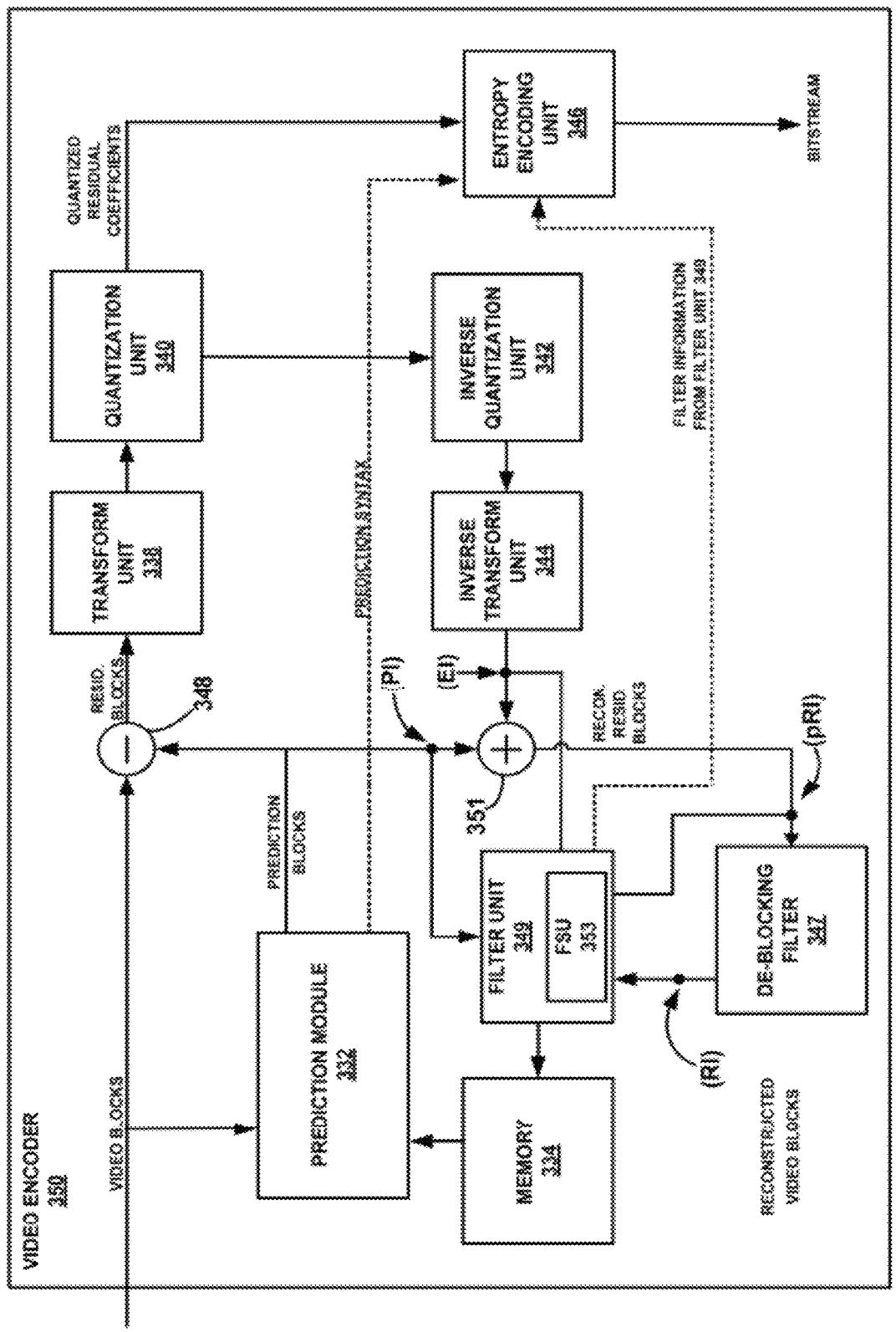
FIG. 3 is a block diagram illustrating an exemplary video encoder consistent with this disclosure.

FIG. 3 is a block diagram illustrating a video encoder 350 consistent with this disclosure. Video encoder 350 may correspond to video encoder 122 of source device 112, or a video encoder of a different device. As shown in FIG. 3, video encoder 350 includes a prediction module 332, adders 348 and 351, and a memory 334. Video encoder 350 also includes a transform unit 338 and a quantization unit 340, as well as an inverse quantization unit 342 and an inverse transform unit 344. Video encoder 350 also includes a deblocking filter 347 and an adaptive filter unit 349. Video encoder 350 also includes an entropy encoding unit 346. Filter unit 349 of video encoder 350 may perform filtering operations and also may include a filter selection unit (FSU) 353 for identifying a desirable or preferred filter or set of filters to be used for decoding. Filter unit 349 may also generate filter information identifying the selected filters so that the selected filters can be efficiently communicated as filter information to another device to be used during a decoding operation.

During the encoding process, video encoder 350 receives a video block, such as an LCU, to be coded, and prediction module 332 performs predictive coding techniques on the video block. Using the quadtree partitioning scheme discussed above, prediction module 332 can partition the video block and perform predictive coding techniques on CUs of different sizes. For inter coding, prediction module 332 compares the video block to be encoded, including sub-blocks of the video block, to various blocks in one or more video reference frames or slices in order to define a predictive block. For intra coding, prediction module 332 generates a predictive block based on neighboring data within the same CU. Prediction module 332 outputs the prediction block and adder 348 subtracts the prediction block from the video block being coded in order to generate a residual block.

For inter coding, prediction module 332 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. For intra coding, prediction module 332 generates a predictive block based on neighboring data within the same CU. One or more intra-prediction modes may define how an intra prediction block can be defined.

After prediction module 332 outputs the prediction block and adder 348 subtracts the prediction block from the video block being coded in order to generate a residual block, transform unit 338 applies a transform to the residual block. The transform may comprise a discrete cosine transform (DCT) or a conceptually similar transform such as that defined by a coding standard such as the HEVC standard.

Wavelet transforms, integer transforms, sub-band transforms or other types of transforms could also be used. In any case, transform unit 338 applies the transform to the residual block, producing a block of residual transform coefficients. The transform may convert the residual information from a pixel domain to a frequency domain.

Quantization unit 340 then quantizes the residual transform coefficients to further reduce bit rate. Quantization unit 340, for example, may limit the number of bits used to code each of the coefficients. After quantization, entropy encoding unit 346 scans the quantized coefficient block from a two-dimensional representation to one or more serialized one-dimensional vectors. The scan order may be pre-programmed to occur in a defined order (such as zig-zag scanning, horizontal scanning, vertical scanning, combinations, or another pre-defined order), or possibly adaptive defined based on previous coding statistics.

Following this scanning process, entropy encoding unit 346 encodes the quantized transform coefficients (along with any syntax elements) according to an entropy coding methodology, such as CAVLC or CABAC, to further compress the data. Syntax elements included in the entropy coded bitstream may include prediction syntax from prediction module 332, such as motion vectors for inter coding or prediction modes for intra coding. Syntax elements included in the entropy coded bitstream may also include filter information from filter unit 349, which can be encoded in the manner described herein.

CAVLC is one type of entropy encoding technique supported by the ITU H.264/MPEG4, AVC standard, which may be applied on a vectorized basis by entropy encoding unit 346. CAVLC uses variable length coding (VLC) tables in a manner that effectively compresses serialized "runs" of transform coefficients and/or syntax elements. CABAC is another type of entropy coding technique supported by the ITU H.264/MPEG4, AVC standard, which may be applied on a vectorized basis by entropy encoding unit 346. CABAC involves several stages, including binarization, context model selection, and binary arithmetic coding. In this case, entropy encoding unit 346 codes transform coefficients and syntax elements according to CABAC. Like the ITU H.264/MPEG4, AVC standard, the emerging HEVC standard may also support both CAVLC and CABAC entropy coding. Furthermore, many other types of entropy coding techniques also exist, and new entropy coding techniques will likely emerge in the future. This disclosure is not limited to any specific entropy coding technique.

Following the entropy coding by entropy encoding unit 346, the encoded video may be transmitted to another device or archived for later transmission or retrieval. Again, the encoded video may comprise the entropy coded vectors and various syntax, which can be used by the decoder to properly configure the decoding process. Inverse quantization unit 342 and inverse transform unit 344 apply inverse quantization and inverse transform, respectively, to reconstruct the residual block in the pixel domain. Summer 351 adds the reconstructed residual block to the prediction block produced by prediction module 332 to produce a pre-deblocked reconstructed video block, sometimes referred to as pre-deblocked reconstructed image. De-blocking filter 347 may apply filtering to the pre-deblocked reconstructed video block to improve video quality by removing blockiness or other artifacts. The output of the de-blocking filter 347 can be referred to as a post-deblocked video block, reconstructed video block, or reconstructed image.

Filter unit 349 can be configured to receive a single input or multiple inputs. In the example of FIG. 3, filter unit 349 receives as input the post-deblocked reconstructed image (RI), pre-deblocked reconstructed image (pRI), the prediction image (PI), and the reconstructed residual block (EI). Filter unit 349 can use any of these inputs either individually or in combination to produce a reconstructed image to store in memory 334. Additionally, as will be discussed in more detail below, based on two or more metrics, one or more filters can be selected to be applied to the input(s). In one example, the output of filter unit 349 may be one additional filter applied to RI. In another example, the output of filter unit 349 may be one additional filter applied to pRI. In other examples, however, the output of filter unit 349 may be based on multiple inputs. For example, filter unit 349 may apply a first filter to pRI and then use the filtered version of pRI in conjunction with filtered versions of EI and PI to create a reconstructed image. In instances where the output of filter unit 349 is the product of one additional filter being applied to a single input, filter unit 349 may in fact apply filters to the other inputs, but those filters might have all zero coefficients. Similarly, if the output of filter unit 349 is the product of applying three filters to three inputs, filter unit 349 may in fact apply a filter to the fourth input, but that filter might have all zero coefficients.

Filter unit 349 may also be configured to receive a single input. For example, although FIG. 3 shows PI, EI, pRI, and RI being input into filter unit 349, in some implementations RI might be the only input received by filter unit 349. In such an implementation, filter unit 349 might apply a filter to RI so that a filtered version of RI is more similar to the original image than the unfiltered version of RI. In other implementations, filter unit 349 and de-blocking filter 347 may be combined into a single filtering unit that applies filtering to pRI. The techniques of this disclosure, which generally relate to multi-metric-based filter mapping, are compatible with both single-input and multi-input filtering schemes that utilize multiple filters.

Filtering by filter unit 349 may improve compression by generating predictive video blocks that more closely match video blocks being coded than unfiltered predictive video blocks. After filtering, the reconstructed video block may be used by prediction module 332 as a reference block to inter-code a block in a subsequent video frame or other CU. Although filter unit 349 is shown "in-loop," the techniques of this disclosure could also be used with post filters, in which case non-filtered data (rather than filtered data) would be used for purposes of predicting data in subsequent CUs.

For a series of video blocks, such as a slice or frame, filter unit 349 may select sets of filters for each input in a manner that promotes the video quality. For example, filter unit 349 may select sets of filters from pre-defined sets of coefficients, or may adaptively define filters in order to promote video quality or improved compression. Filter unit 349 may select or define one or more sets of filters for a given CU such that the same set(s) of filters are used for pixels of different video blocks of that CU. For a particular frame, slice, or LCU, filter unit 349 may apply several sets of filters to multiple inputs, and FSU 353 may select the set that produces the best quality video or the highest levels of compression. Alternatively, FSU 353 may train a new filter by analyzing the auto-correlations and cross-correlations between multiple inputs and an original image. A new set of filters may, for example, be determined by solving Wienter-Hopt equations based on the auto- and cross-correlations. Regardless of whether a new set of filters is trained or an existing set of filters are selected, filter unit 349 generates syntax for inclusion in the bitstream that enables a decoder to also identify the set or sets of filters to be used for the particular frame or slice.

According to this disclosure, for each pixel of a CU within the series of video blocks, filter unit 349 may select which filter from the set of filters is to be used based on two or more metrics that quantify properties associated with one or more sets of pixels within the CU. In this way, FSU 353 may determine sets of filters for a higher level coded unit such as a frame or slice, while filter unit 349 determines which filter(s) from the set(s) is to be used for a particular pixel of a lower level coded unit based on the two or more metrics associated with the pixels of that lower level coded unit.

A set of M filters may be used for each input. Depending on design preferences, M may, for example, be as few as 2 or as great as 16, or even higher. A large number of filters per input may improve video quality, but also may increase overhead associated with signaling sets of filters from encoder to decoder. The set of M filters can be determined by FSU 353 as described above and signaled to the decoder for each frame or slice. A segmentation map can be used to indicate how a CU is segmented and whether or not a particular sub-unit of the CU is to be filtered. The segmentation map, may for example, include for a CU an array of split flags as described above as well an additional bit signaling whether each sub-CU is to be filtered. For each input associated with a pixel of a CU that is to be filtered, a specific filter from the set of filters can be chosen based on two or more metrics. Combinations of values for two or more metrics can be indexed to particular filters from the set of M filters.

Figure 4A:
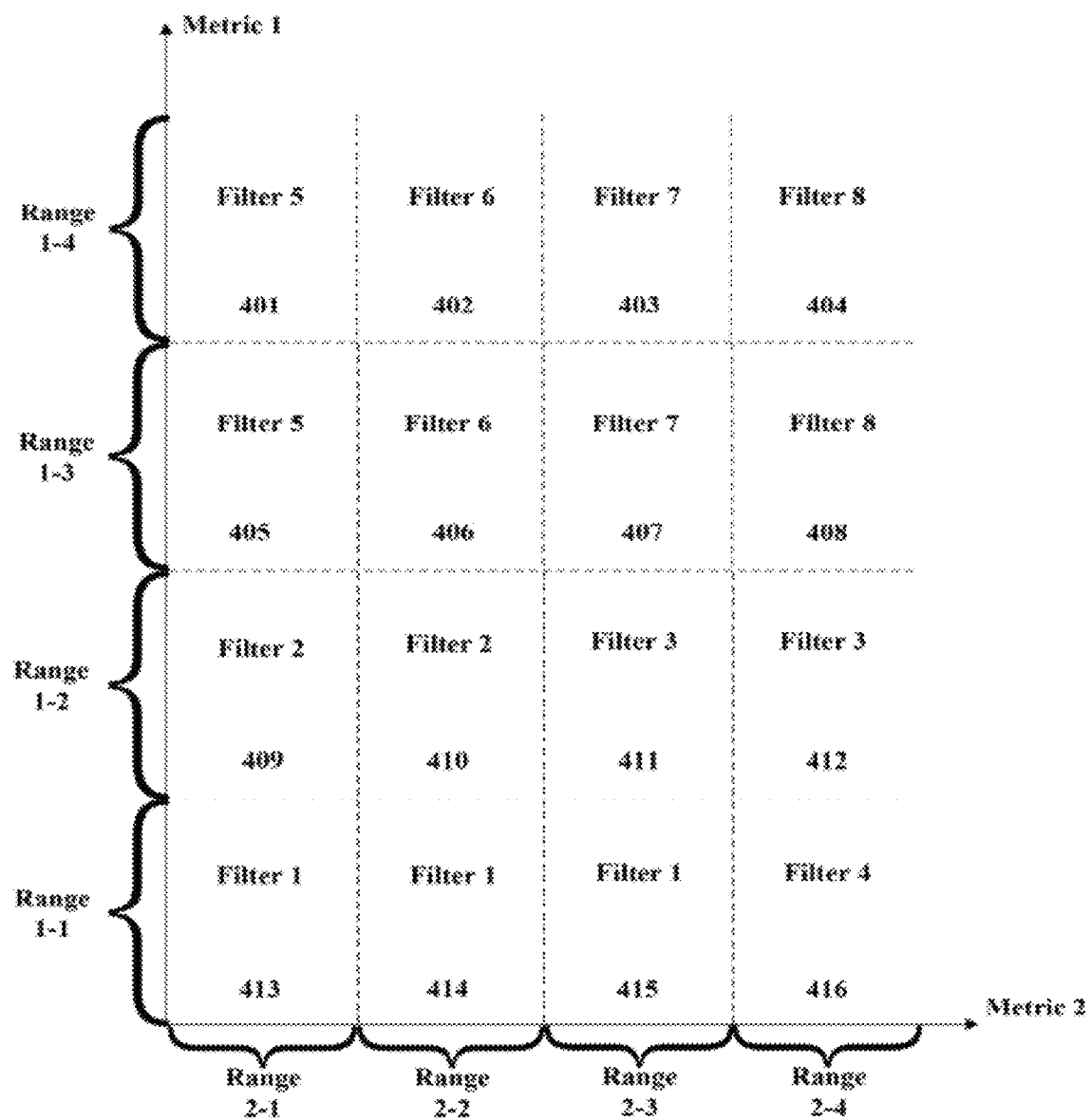
FIG. 4A is a conceptual diagram illustrating a mapping of ranges for two metrics to filters.

FIG. 4A is a conceptual diagram illustrating ranges of values for two metrics indexed to filters from a set of filters. The particular example of FIG. 4A shows eight filters (i.e. Filter 1, Filter 2 . . . Filter 8), but more or fewer filters may similarly be used. FIG. 4A shows two metrics that might be used for selecting a filter in accordance with the techniques of this disclosure. The two metrics may, for example, quantify properties of the pixel data related to non-direction specific activity (e.g. a sum-modified Laplacian value) and direction, direction-specific activity and edge detection, a direction metric and an edge metric, a horizontal activity metric and a vertical activity metric, or two other such metrics. In some instances, three or more metrics might be used, in which case the conceptual diagram of FIG. 4A would include a third dimension for mapping ranges of the metrics to filters from the set of filters.

In the example of FIG. 4A, a first metric (Metric 1) has four ranges (Ranges 1-1, 1-2, 1-3, and 1-4), and a second metric (Metric 2) also has four ranges (Ranges 2-1, 2-2, 2-3, and 2-4). Therefore, the example of FIG. 4A has sixteen combinations of ranges for Metric 1 and Metric 2. As can be seen from FIG. 4A, however, each combination is not necessarily associated with a unique filter. The combination of Range 1-1 and Range 2-1, as well as combinations 1-1 and 2-2, and 1-1 and 2-3, for instance, are all mapped to Filter 1, in the example of FIG. 4A. Filter 4, in contrast, is only mapped to one combination (1-1 and 2-4). Although the ranges of FIG. 4A are shown as being relatively equal, the sizes of ranges may vary. For example, in some implementations, Range 1-1 may encompass a greater range of values than Range 1-2. Additionally, although FIG. 4A shows Metric 1 and Metric 2 as having the same number of ranges, the number of ranges for a first metric and the number of ranges for a second metric do not necessarily need to be equal. If, for example, Metric 1 is a variance metric and Metric 2 is a direction metric, Metric 1 might use eight ranges while Metric 2 uses three ranges.

In some examples, the ranges of Metric 1 and Metric 2 may represent a continuous spectrum of values. For example, if Metric 1 is a sum-modified Laplacian value, Range 1-2 may correspond to more activity than Range 1-1 but less activity than Range 1-3, and Range 1-4 may correspond to more activity than Range 1-3. Within a range, the amount of activity determined for a particular pixel or group of pixels may similarly increase along the Metric 1 axis. In other examples, the ranges of Metric 1 and Metric 2 may not represent actual ranges but instead may represent discrete determinations. For example, if Metric 2 is a direction metric, Range 1-1 may correspond to a determination of no direction, Range 2-2 may correspond to a determination of horizontal direction, Range 2-3 may correspond to a determination of vertical direction, and Range 2-4 may represent a determination of diagonal direction. As will be described in more detail below, no direction, horizontal direction, vertical direction, and diagonal direction can be discrete determinations, and thus, the ranges for Metric 2 might not represent a continuous spectrum of values in the same way the ranges of Metric 1 do.

Figure 4B:
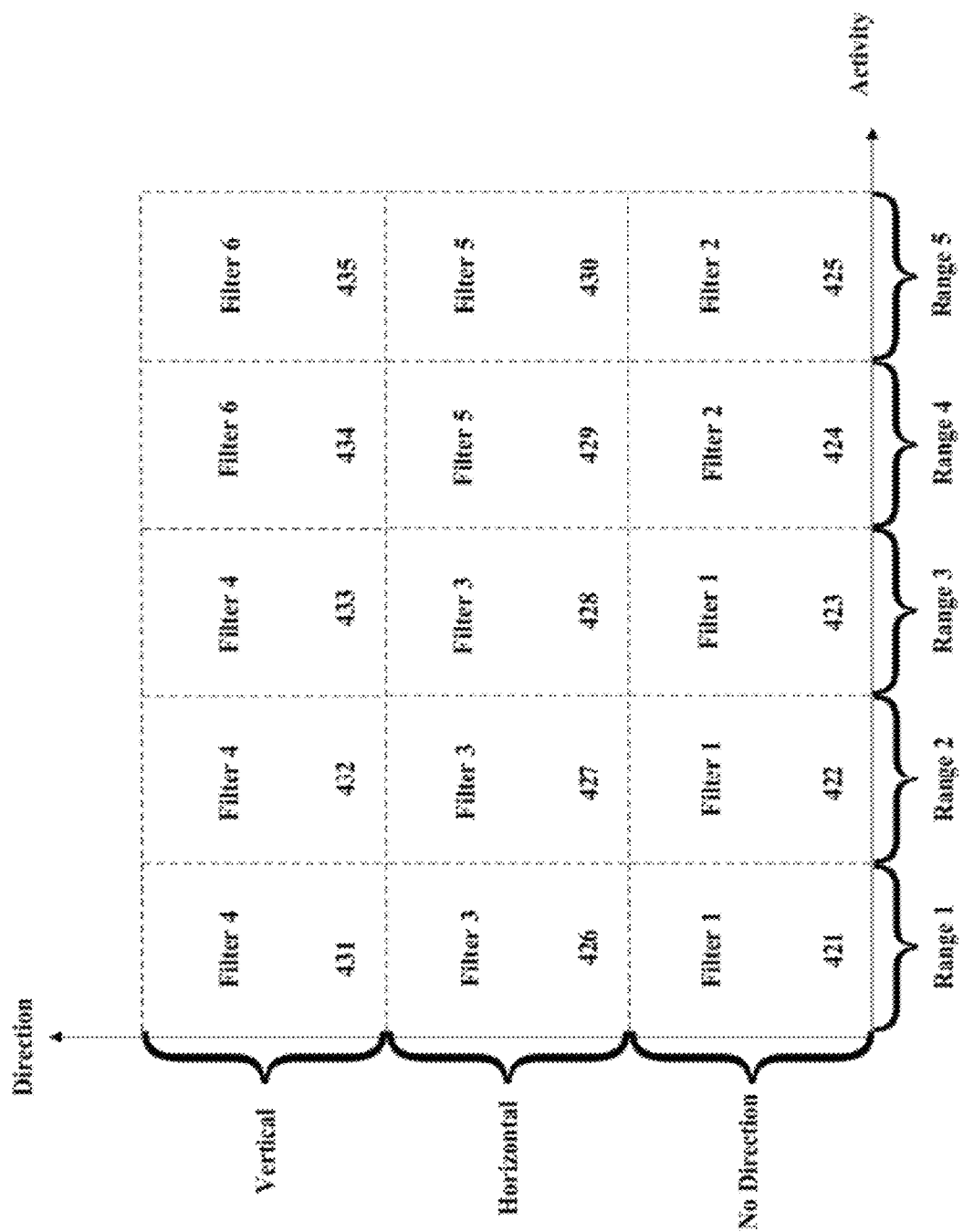
FIG. 4B is a conceptual diagram illustrating a mapping of ranges for an activity metric and a direction metric to filters.

FIG. 4B is a conceptual diagram illustrating ranges of values for an activity metric and a direction metric. In the example of FIG. 4B, the direction metric includes three discrete determinations (No Direction, Horizontal, and Vertical). Techniques for determining no direction, horizontal, and vertical as well as techniques for determining activity will be explained in greater detail below. The particular example of FIG. 4B shows six filters (i.e. Filter 1, Filter 2 . . . Filter 6), but more or fewer filters may similarly be used. As can be seen by FIG. 4B, the two metrics (activity and direction) create 15 combinations, identified as combinations 421 through 435. In some instances, however, additional combinations not explicitly shown in FIG. 4B may also be used. For example, a combination corresponding to no activity may be a 16th combination that also has a corresponding filter.

Filter unit 349 can store a mapping of filters to combinations of ranges of two or more metrics, such as the example mappings of FIGS. 4A and 4B, and use the mapping to determine which filter from a set of filters to apply to a particular pixel or group of pixels in a CU. The mapping of filters to combinations of ranges of two or more metrics may, for example, be determined by filter unit 349 as part of the filter selection process described above. Regardless of how the mapping is determined, filter unit 349 can generate information allowing a decoder to reconstruct the mapping. This information can be included in the coded bitstream to signal the mapping of combinations of ranges to filters. The mapping of combinations to ranges signaled may map range combinations to filter identifications IDs. The actual coefficients for a particular filter might be signaled separately.

In order to generate this information, filter unit 349 first determines a transmission order for the combinations. The transmission order generally refers to the order in which filters will be signaled for combinations of ranges. Using FIG. 4A as an example, filter unit 349 might use a left-to-right, top-to-bottom transmission order where the filter for combination 401 is signaled first, the filter for combination 402 is signaled second, and the remaining combinations are signaled in the order of 403=>404=>405=>406=>407=>408=>409=>410=>411=>412=>413=>414=>415=>416. Filter unit 349 might also use a top-to-bottom, zig-zag transmission order where the filters for combinations are signaled in the order of 401=>402=>403=>404=>408=>407=>406=>405=>409=>410=>411=>412=>416=>415=>414=>413. Filter unit 349 might also use a top-to-bottom, left-to-right transmission order where the filters for combinations are signaled in the order of 401=>405=>409=>413=>402=>406=>410=>414=>403=>407=>411=>415=>404=>408=>412=>416. Filter unit 349 might also use a left-to-right, zig-zag transmission order where the filters for combinations are signaled in the order of 401=>405=>409=>413=>414=>410=>406=>402=>403=> 407=>411=>415=>416=>412=>408=>404. Referring to FIG. 4B, filter unit 349 may use a left-to-right, bottom-to-top transmission order such that the transmission order is 421=>422=>423=>424=>425=>426=>427=>428=>429=> 430=>431=>432=>433=>434=>435. As can be imagined, these are just a few of the many transmission orders that are possible.

According to a technique of this disclosure, filter unit 349 can use a series of codewords to signal the mapping to a decoder. For example, filter unit 349 can generate a first codeword to indicate if a current combination being decoded maps to the same filter as the most recently decoded combination that shares the same range for the first metric. If a current combination being decoded maps to the same filter as the most recently decoded combination that shares the same range for the second metric, then filter unit 349 can generate a second codeword instead of the first codeword. If a current combination being decoded does not map to the same filter as either of these most recently decoded combinations, then filter unit 349 can generate a third codeword, instead of the first codeword or second codeword, that indicates the filter corresponding to the current combination being decoded. The first and second codeword of the current example may be relatively short compared to the third codeword. For example, the first codeword and second codeword might each be two bits (e.g. 00 and 01, respectively), while the third codeword is more bits (a first bit of 1, plus additional bits). In this particular context, a current combination being decoded or a previous combination being decoded refers to the portion of the encoding and decoding processes where the mapping of filters to range combinations is being signaled by an encoder or constructed by a decoder, and not necessarily to a transmission or decoding of the combination itself.

Examples of the techniques described above will now be given with reference to FIG. 4A and a top-to-bottom, left-to-right transmission order. If, for example, combination 407 is the combination currently being decoded, then combination 406 is the most recently decoded combination that shares the same range for Metric 1, and combination 403 is the most recently decoded combination that shares the same range for Metric 2. If combination 407 maps to the same filter (Filter 7 in FIG. 4A) as the most recently decoded combination that shares the same range for a second metric (i.e. Range 2-3 for Metric 2), then filter unit 349 can transmit a second codeword (e.g. 01) to indicate that the current combination being decoded (combination 407) maps to the same filter as the most recently decoded combination that shares the same range for a second metric (combination 403).

If, for example, combination 410 is the current combination being decoded, then combination 409 is the most recently decoded combination that shares the same range for Metric 1, and combination 406 is the most recently decoded combination that shares the same range for Metric 2. If combination 410 maps to the same filter (Filter 2 in FIG. 4A) as the most recently decoded combination that shares the same range for a first metric (i.e. Range 1-2 for Metric 1), then filter unit 349 can transmit a first codeword (e.g. 00) to indicate that the current combination being decoded (combination 410) maps to the same filter (Filter 2) as the most recently decoded combination that shares the same range for a first metric (combination 409).

If, for example, combination 411 is the current combination being decoded, then combination 410 is the most recently decoded combination that shares the same range for Metric 1, and combination 407 is the most recently decoded combination that shares the same range for Metric 2. If combination 411 does not map to the same filter as either of combination 410 or combination 407, then filter unit 349 can transmit a third codeword (e.g. 1+additional bits) to indicate that the current combination being decoded (combination 411) maps to a different filter (Filter 3) than both the most recently decoded combination that shares the same range for Metric 1 and the most recently decoded combination that shares the same range for Metric 2.

For those current combinations where a combination that shares the same range for Metric 1 or a combination that shares the same range for Metric 2 have not yet been decoded, then those options can either be considered unavailable or can be replaced by a different combination. If, for example, combination 409 is the current combination to be decoded, then combination 405 is the most recently decoded combination that shares the same range for Metric 2, but no combination that shares a range for Metric 1 has yet been decoded. In such instances, the most recently decoded combination that shares a range for Metric 1 can be assumed to not map to the same filter as the current combination being decoded. Thus, in this case, the first codeword will not be used for combination 409. Alternatively, the combination that shares a range for Metric 1 can be replaced by another combination, such as the most recently decoded combination or a different previously decoded combination. In such an instance, the most recently decoded combination before combination 409 would be combination 408. Thus, if combination 408 maps to the same filter as combination 409, then filter unit 349 can generate the first codeword. Analogous techniques can be used for those combinations where a previous combination sharing common range for Metric 1 have not yet been decoded.

For the first combination in a transmission order (e.g. combination 401 in the example of FIG. 4A), where neither a combination that shares the same range for Metric 1 or a combination that shares the same range for Metric 2 have been decoded, filter unit 349 can generate a codeword indicating the filter that maps to the first combination. The filter may, for example, be signaled using the third codeword or may be signaled using a different technique, in which case the techniques described in this disclosure might begin with the second combination in a transmission order or a later combination.

According to another technique of this disclosure, filter unit 349 can use a series of codewords to signal the mapping to a decoder. In some implementations, filter unit 349 can generate a first codeword to indicate if a current combination being decoded maps to the same filter as the most recently decoded combination that shares the same range for the first metric. If a current combination being decoded does not map to the same filter as the most recently decoded combination that shares that range for the first metric, then filter unit 349 can generate a second codeword, instead of the first codeword, that indicates the filter that maps to the current combination being decoded. In this example, the first codeword may be relatively short compared to the second codeword. For example, the first codeword might be one bits (e.g. 0), while the second codeword is more bits (e.g., a first bit of 1, plus additional bits). Unlike the previous technique where a short codeword might be generated if a current combination maps to the same filter as a previously decoded combination that shares the same range for either Metric 1 or Metric 2, this technique includes only generating a short codeword if the current combination maps to the same filter as a previously decoded combination that shares the same range for Metric 1. Thus, even if the current combination maps to the same filter as a previously decoded combination that shares the same range for Metric 2, filter unit 349 still generates a second codeword (e.g. 1+additional bits). Although this disclosure is using Metric 1 for purposes of explanation, the same techniques can also be applied using only Metric 2.

According to yet another technique of this disclosure, filter unit 349 can use a different series of codewords to signal the mapping to a decoder. For example, filter unit 349 can generate a first codeword to indicate if a current combination being decoded maps to the same filter as the most recently decoded combination, regardless of which, if any, range the current combination has in common with the previously decoded combination. If the current combination being decoded does not map to the same filter as the most recently decoded combination, then filter unit 349 can generate a second codeword identifying the filter that maps to the current combination. In this particular implementation, the first codeword may be relatively short compared to the second codeword. For example, the first codeword might be one bits (e.g. 0), while the second codeword is more bits (e.g., a first bit of 1, plus additional bits).

Again, using the example of FIG. 4A and a top-to-bottom, left-to-right transmission order, combination 401 would be the most recently decoded combination if combination 402 is currently being decoded, combination 402 would be the most recently decoded combination if combination 403 is the current combination, and so on. 404 would be the most recently decoded combination if combination 405 is the current combination being decoded. Thus, filter unit 349 can generate the first codeword if combination 402 maps to the same filter as combination 401, if combination 403 maps to the same filter as combination 402, etc. Otherwise, filter unit 349 can generate the second codeword identifying the filter that maps to the current combination.

According to yet another technique of this disclosure, filter unit 349 can use two codewords to signal the mapping of the filters to combinations. A first codeword, such as a "0", can be used to signal that a current combination uses the same filter as a previous combination. A second codeword, such as a "1", can be used to signal that a current combination has a different filter than the previous combination. The second codeword, however, does not need to identify a new filter. Instead, the new filter can be determined based on the transmission order for the classes and the order in which filter coefficients are transmitted. Using the left-to-right, bottom-to-top transmission order described above for FIG. 4B as an example, codewords might be transmitted accordingly: 421 (0)=>422 (0)=>423 (1)=>424 (0)=>425 (0)=>426 (0)=>427 (0)=>428 (1)=>429 (0)=>430 (0)=>431 (0)=>432 (1)=>433 (0)=>434 (0)=>435 (0), with the number in parentheses representing the codeword for that combination. In this example, combinations 421-422 would be mapped to a first filter, combinations 423-427 to a second filter, combinations 428-431 to a third filter, and combinations 432-435 to a fourth filter. The coefficients for the first filter, second filter, third filter, and fourth filter can correspond to the order in which sets of filter coefficients are signaled, where the first set of filter coefficients signaled correspond to the first filter, the second set of filter coefficients signaled correspond to the second filter, and so on. Determining an order for transmitting sets of filter coefficients is discussed in more detail below.

The various techniques described in this disclosure for signaling a mapping of filters to combinations of ranges are not mutually exclusive alternatives, but rather, may be used in conjunction with one another. For example, in some implementations, certain combinations might be signaled using a first technique while other combinations are signaled using a second technique. As one example, where one of a combination that shares the same range for Metric 1 or a combination that shares the same range for Metric 2 have not yet been decoded (e.g. combinations 402, 403, 404, 405, 409, and 413), then filter unit 349 may use a first technique. Where both a combination that shares the same range for Metric 1 and a combination that shares the same range for Metric 2 have been decoded (e.g. combinations 406, 407, 408, 410, 411, 412, 414, 415, and 416), then a second technique might be used. Additionally, the codewords used for any of the first, second, and third codewords described above may be any of fixed length codewords, variable length codewords, or context-adaptive variable length codewords.

In addition to generating information allowing a decoder to reconstruct the mapping of filters to combinations of ranges, filter unit 349 also generates information allowing a decoder to reconstruct the filters themselves. Reconstructing the filters includes reconstructing the filter coefficients of the filters. As will be described in more detail below, filter unit 349 can use differential coding techniques to signal the filter coefficients. To use differential coding technique, filter unit 349 determines an order in which to signal the sets of filter coefficients.

As part of determining the order, filter unit 349 determines a combination identification (ID) that represents a sequential value for each combination of ranges. Using FIG. 4A as an example, the combinations might be assigned combination IDs that represent sequential values in a left-to-right, top-to-bottom order, in which case combination 401 would be assigned the first sequential value, combination 402 would be assigned the second sequential value, and the remaining combinations would be assigned sequential values in the order of 403=>404=>405=>406=>407=>408=>409=>410=>411=> 412=>413=>414=>415=>416. Filter unit 349 might also assign the combination IDs using a top-to-bottom, zig-zag order where the combinations would be assigned combination IDs with sequential values that are in an order of 401=>402=>403=>404=>408=>407=>406=>405=>409=> 410=>411=>412=>416=>415=>414=>413. Filter unit 349 might also assign combination IDs using a top-to-bottom, left-to-right order where the combinations are assigned combination IDs with sequential values that are in an order of 401=>405=>409=>413=>402=>406=>410=>414=>403=> 407=>411=>415=>404=>408=>412=>416. Filter unit 349 might also use a left-to-right, zig-zag order where the combinations are assigned combination IDs with sequential values in an order of 401=>405=>409=>413=>414=>410=>406=>402=>403=> 407=>411=>415=>416=>412=>408=>404. As can be imagined, these are just a few of the many orders that could be used. Furthermore, any of the orders described could be either lowest to highest or highest to lowest.

After filter unit 349 has determined the mapping of filters to range combinations, filter unit 349 can identify groupings of range combinations that are mapped to the same filter. Using FIG. 4A as an example, the groupings would be as follows.

Filter 1 Group: combinations 413, 414, and 415
Filter 2 Group: combinations 409, 410
Filter 3 Group: combinations 411 and 412
Filter 4 Group: combination 416
Filter 5 Group: combinations 401 and 405
Filter 6 Group: combinations 402 and 406
Filter 7 Group: combinations 403 and 407
Filter 8 Group: combinations 404 and 408.

Filter unit 349 can then assign each group a group ID, and the group ID can represent a sequential value. The group IDs can be assigned to the groups based on the sequential values associated with the combinations that comprise the group. For example, the group that has the combination with the lowest associated sequential value based on the combination IDs, might be assigned the group ID with the lowest sequential value. Of the remaining groups, the remaining group that has the combination with the lowest associated sequential value can be assigned the group ID with the next lowest sequential value. This process can repeat until all groups have been assigned a group ID. In some implementations, group IDs might be assigned based on the combinations with the highest associated sequential values rather than the lowest. In some implementations, the group that has the combination with the lowest associated sequential value based on the combination IDs, might be assigned the group ID with the highest sequential value, or vice versa.

Again, using FIG. 4A as an example, and assuming that combinations 401-416 are assigned combination IDs with sequential values in a left-to-right, top-to-bottom order, then filter unit 349 can assign group IDs to the filter groups, as shown below in Table 1.

TABLE 1

| Group Name | Combinations in group | Combination with lowest sequential value | Group ID |
|---|---|---|---|
| Filter 1 Group | 413, 414, 415 | 413 | 7 |
| Filter 2 Group | 409, 410 | 409 | 5 |
| Filter 3 Group | 411, 412 | 411 | 6 |
| Filter 4 Group | 416 | 416 | 8 |
| Filter 5 Group | 401, 405 | 401 | 1 |
| Filter 6 Group | 402, 406 | 402 | 2 |
| Filter 7 Group | 403, 407 | 403 | 3 |
| Filter 8 Group | 404, 408 | 404 | 4 |

In the example of FIG. 4A, shown in Table 1, filter unit 349 assigns the Filter 5 Group the group ID with the lowest sequential value because the Filter 5 Group includes the range combination with the lowest sequential value (i.e., combination 401). Filter unit 349 assigns the Filter 6 Group the group ID with the second lowest sequential value because, of the remaining filter groups (i.e. all the groups excluding the Filter 5 Group), the Filter 6 Group includes the range combination with the second lowest sequential value (i.e., combination 402). Filter unit 349 assigns the Filter 7 Group the group ID with the third lowest sequential value because, of the remaining filter groups (i.e. all the filter groups excluding the Filter 5 Group and the Filter 6 Group), the Filter 7 Group includes the range combination with the lowest sequential value (i.e., combination 403). Filter unit 349 assigns the Filter 8 Group the group ID with the fourth lowest sequential value because, of the remaining filter groups (i.e. all the filter groups excluding the Filter 5 Group, the Filter 6 Group, and the Filter 7 Group), the Filter 8 Group includes the range combination with the fourth lowest sequential value (combination 404). Filter unit 349 assigns the Filter 2 Group the group ID with the fifth lowest sequential value because, of the remaining filter groups (i.e. excluding the Filter 5 Group, the Filter 6 Group, the Filter 7 Group, and the Filter 8 Group), the Filter 2 Group includes the range combination with the lowest sequential value (combination 409). Filter unit 349 assigns the Filter 3 Group the group ID with the sixth lowest sequential value because, of the remaining filter groups (i.e. excluding the Filter 5 Group, the Filter 6 Group, the Filter 7 Group, the Filter 8 Group, and the Filter 2 Group), the Filter 3 Group includes the range combination with the lowest sequential value (combination 411). Filter unit 349 assigns the Filter 1 Group the group ID with the seventh lowest sequential value because, of the remaining filter groups (i.e. excluding the Filter 5 Group, the Filter 6 Group, the Filter 7 Group, the Filter 8 Group, the Filter 2 Group, and the Filter 3 Group), the Filter 1 Group includes the range combination with the lowest sequential value (combination 413). Finally, filter unit 349 assigns the Filter 4 group, the final remaining filter group, the group ID with the highest sequential value (8 in this particular example).

Based on the filter group IDs, filter unit 349 determines an order in which to signal the filter coefficients of a filter. Again, using the example of FIG. 4A and Table 1, filter unit 349 first signals the coefficient for Filter 5, then the coefficient for Filter 6, then the coefficient for Filter 7, then the coefficient for Filter 8, then the coefficient for Filter 2, then the coefficient for Filter 3, then the coefficient for Filter 1, and finally the coefficient for Filter 4. Using differential coding techniques, as described in this disclosure, filter unit 349 may code the coefficients for Filter 6 as difference information relative to the filter coefficients of Filter 5, code the coefficients for Filter 7 as difference information relative to the filter coefficients for Filter 6, and so on, based on the sequential ordering of Group IDs.

The mapping of two or more metrics for inputs to filters can be implemented in multiple ways. For example, in some implementations each input might have a unique set of filters, while in some implementations inputs share a common set of filters. Additionally, in some implementations, two or more metrics for each input might be used to identify a particular filter for each input. In other implementations, however, two or more metrics for a single input might be used to identify filters for all the inputs. In yet other implementations, two or more metrics for a first input might be used to identify a filter for a second, different input.

In accordance with this disclosure, filter unit 349 may perform coding techniques with respect to filter information that may reduce the amount of data needed to encode and convey filter information from encoder 350 to another device. Again, for each frame or slice, filter unit 349 may define or select one or more sets of filter coefficients to be applied to the pixels of CUs for that frame or slice. Filter unit 349 applies the filter coefficients in order to filter video blocks of reconstructed video frames stored in memory 334, which may be used for predictive coding consistent with in-loop filtering. Filter unit 349 can encode the filter coefficients as filter information, which is forwarded to entropy encoding unit 346 for inclusion in the encoded bitstream.

Additionally, the techniques of this disclosure may exploit the fact that some of the filter coefficients defined or selected by FSU 353 may be very similar to other filter coefficients applied with respect to the pixels of CUs of another frame or slice. The same type of filter may be applied for different frames or slices (e.g., the same filter support), but the filters may be different in terms of filter coefficient values associated with the different indices of the filter support. Accordingly, in order to reduce the amount of data needed to convey such filter coefficients, filter unit 349 may predicatively encode one or more filter coefficients to be used for filtering based on the filter coefficients of another CU, potentially exploiting similarities between the filter coefficients. In some cases, however, it may be more desirable to encode the filter coefficients directly, e.g., without using any prediction. Various techniques, such as techniques that exploit the use of an activity metric to define when to encode the filter coefficients using predictive coding techniques and when to encode the filter coefficients directly without any predictive coding, can be used for efficiently communicating filter coefficients to a decoder. Additionally, symmetry may also be imposed so that a subset of coefficients (e.g., 5, −2, 10) known by the decoder can be used to define the full set of coefficients (e.g., 5, −2, 10, 10, −2, 5). Symmetry may be imposed in both the direct and the predictive coding scenarios.

As described above, video encoder 350 represents an example of a video encoder configured to determine a first metric for a group of pixels within a block of pixels, determine a second metric for the group of pixels, determine a filter based on the first metric and the second metric, and generate a filtered image by applying the filter to the group of pixels. Video encoder 350 also represents an example of a video encoder configured to determine a first metric for a block of pixels, wherein the first metric is determined based on a comparison of a subset of the pixels in the block to other pixels in the block; determine a second metric for the block of pixels; determine a filter based on the first metric and the second metric; and, generate a filtered image by applying the filter to the block of pixels.

As described above, video encoder 350 also represents an example of a video encoder configured to determine a mapping of range combinations to filters, wherein a range combination comprises a range for a first metric and a range for a second metric, wherein each range combination has a unique range combination identification (ID), wherein each unique range combination ID corresponds to a sequential value for a range combination; assign unique group IDs to groups of range combinations based on the sequential values for the range combinations, wherein each unique group ID corresponds to a sequential value for a group; and, code sets of filter coefficients corresponding for the filters based on the unique group IDs. Video encoder 350 can code the sets of filter coefficients by signaling the sets of filter coefficients in a coded bitstream in an order that is selected based on the sequential values of the unique group IDs. Video encoder 350 can signal the sets of filter coefficients using differential coding techniques.

As described above, video encoder 350 also represents an example of a video encoder configured to determine a mapping of range combinations to filters, wherein a range combination comprises a range of values for a first metric and a range of values for a second metric; generate a first codeword if a current range combination is mapped to the same filter as a previous range combination that comprises the same range of values for the first metric; generate a second codeword if a current range combination is mapped to the same filter as a previous range combination that comprises the same range of values for the second metric; and, generate a third codeword if the current range combination is mapped to a different filter than the previous range combination that comprises the same range of values for the first metric and the previous range combination that comprises the same range of values for the second metric. Video encoder 350 also represents an example of a video encoder configured to determine a mapping of range combinations to filters, wherein a range combination comprises a range for a first metric and a range for a second metric; generate a first codeword if a current range combination is mapped to the same filter as a previous range combination; and, generate a second codeword if the current range combination is mapped to a different filter than the previous range combination, wherein the second codeword identifies a filter mapped to the current range combination.

Figure 5:
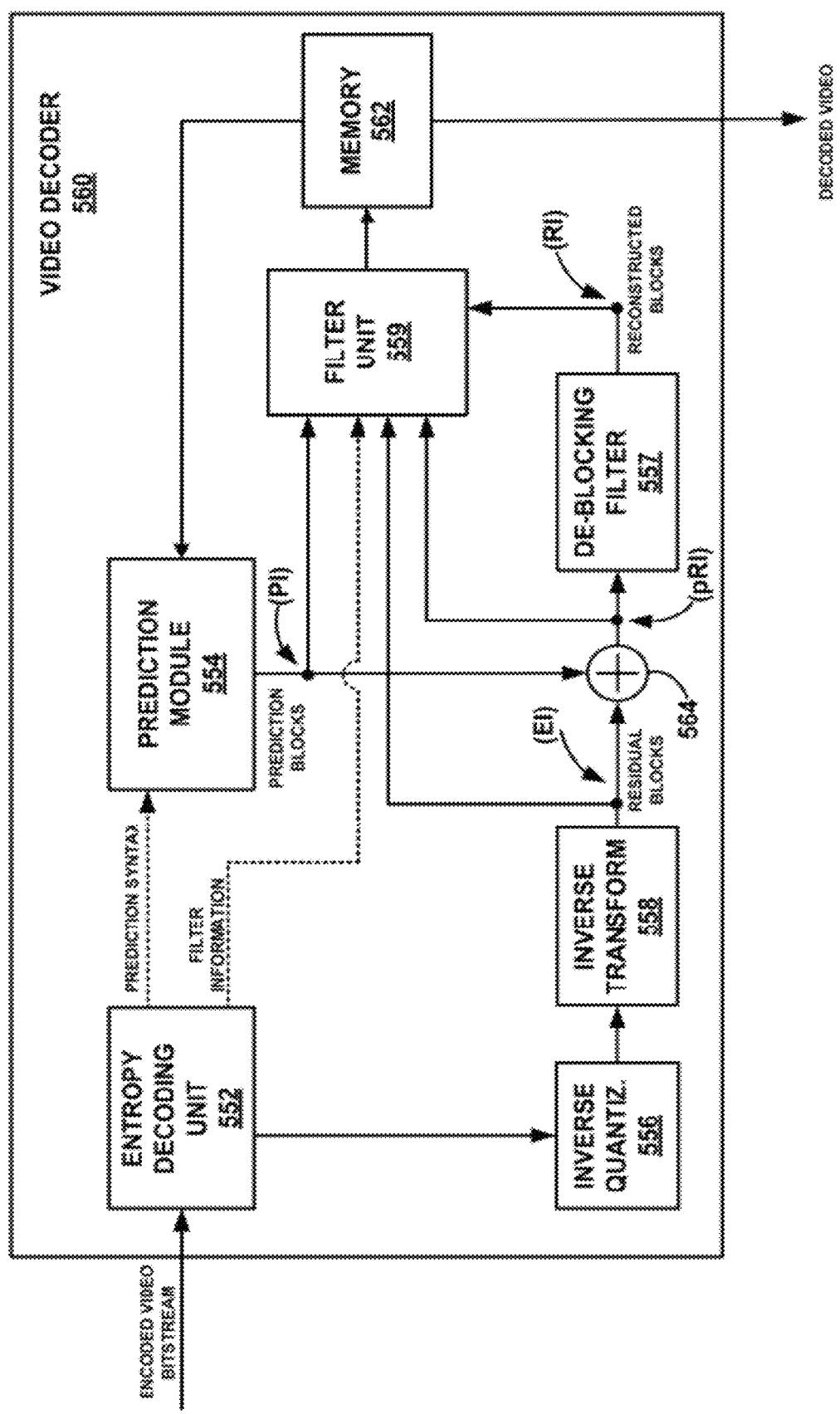
FIG. 5 is a block diagram illustrating an exemplary video decoder consistent with this disclosure.

FIG. 5 is a block diagram illustrating an example of a video decoder 560, which decodes a video sequence that is encoded in the manner described herein. The received video sequence may comprise an encoded set of image frames, a set of frame slices, a commonly coded group of pictures (GOPs), or a wide variety of types of series of video blocks that include encoded video blocks and syntax to define how to decode such video blocks.

Video decoder 560 includes an entropy decoding unit 552, which performs the reciprocal decoding function of the encoding performed by entropy encoding unit 346 of FIG. 3. In particular, entropy decoding unit 552 may perform CAVLC or CABAC decoding, or any other type of entropy decoding used by video encoder 350. Entropy decoded video blocks in a one-dimensional serialized format may be inverse scanned to convert one or more one-dimensional vectors of coefficients back into a two-dimensional block format. The number and size of the vectors, as well as the scan order defined for the video blocks may define how the two-dimensional block is reconstructed. Entropy decoded prediction syntax may be sent from entropy decoding unit 552 to prediction module 554, and entropy decoded filter information may be sent from entropy decoding unit 552 to filter unit 559.

Video decoder 560 also includes a prediction module 554, an inverse quantization unit 556, an inverse transform unit 558, a memory and a summer 564. In addition, video decoder 560 also includes a de-blocking filter 557 that filters the output of summer 564. Consistent with this disclosure, filter unit 559 may receive entropy decoded filter information that includes one or more filters to be applied to one or more inputs. Although not shown on FIG. 5, de-blocking filter 557 may also receive entropy decoded filter information that includes one or more filters to be applied.

The filters applied by filter unit 559 may be defined by sets of filter coefficients. Filter unit 559 may be configured to generate the sets of filter coefficients based on the filter information received from entropy decoding unit 552. The filter information may include filter description syntax that identifies a maximum number of filters in a set of filters and/or a shape of filters in a set of filters, for example. The filter description syntax can be included in a header of a series of video blocks, e.g., an LCU header, a frame header, a slice header, a GOP header, a sequence header, or the like. In other examples, the filter description syntax might be included in a footer or other data structure. Based on the filter description syntax, filter unit 559 can reconstruct the set of filters used at the encoder.

The filter information may also include additional signaling syntax that signals to the decoder the manner of encoding used for any given set of coefficients. In some implementations, the filter information may for example, also include ranges for two or more metrics for which any given set of coefficients should be used. Following decoding of the filters, filter unit 559 can filter the pixel values of decoded video blocks based on the one or more sets of filter coefficients and the signaling syntax that includes the ranges for which the different sets of filter coefficients should be used.

Filter unit 559 may receive in the bitstream one or more syntax elements indicating a set of filters for each frame or slice as well as a mapping of filters to the two or more metrics. For example, if an encoder uses the mapping of ranges for metrics to filters shown in FIG. 4A, then the encoder will either signal this mapping or transmit data to allow filter unit 559 to reconstruct this mapping. Regardless of whether or not this mapping is explicitly signaled, filter unit 559 can maintain the same mapping of filters to combinations of ranges as used by the encoder.

As mentioned above, filter unit 559 generates a mapping based on filter information signaled in the bitstream. Based on this mapping, filter unit 559 can determine groups and assign group IDs to the groups in the same manner described above in relation to filter unit 349. Using these group IDs, filter unit 559 can associate received filter coefficients with For each CU within the frame or slice, filter unit 559 can calculate one or more metrics associated with the decoded pixels of a CU for multiple inputs (i.e. PI, EI, pRI, and RI) in order to determine which filter(s) of the set(s) to apply to each input. Alternatively, filter unit 559 may calculate one or more metrics for a single input, such as pRI or RI. Filter unit 559 determines which filter to apply based on the metrics determined for a particular pixel or group of pixels. Using a sum-modified Laplacian value and direction as examples for Metric 1 and Metric 2 and using the mappings shown in FIG. 4A as an example, if filter unit 559 determines that a pixel or group of pixels has a sum-modified Laplacian value in Range 1-2 and a direction corresponding to Range 2-3, then filter unit 559 can apply Filter 2 to that pixel or group of pixels. If filter unit 559 determines that a pixel or group of pixels has a sum-modified Laplacian value in Range 1-4 and a direction corresponding to Range 2-2, then filter unit 559 can apply Filter 6 to that pixel or group of pixels, and so on. The filter may generally assume any type of filter support shape or arrangement. The filter support refers to the shape of the filter with respect to a given pixel being filtered, and the filter coefficients may define weighting applied to neighboring pixel values according to the filter support. According to the techniques of the present disclosure, syntax data may be included in the bitstream to signal to the decoder how the filters were encoded (e.g., how the filter coefficients were encoded), as well as the ranges of the activity metric for which the different filters should be used.

For each CU within the frame or slice, filter unit 559 can calculate one or more metrics associated with the decoded pixels of a CU for multiple inputs (i.e. PI, EI, pRI, and RI) in order to determine which filter(s) of the set(s) to apply to each input. Alternatively, filter unit 559 may calculate one or more metrics for a single input, such as pRI or RI. Filter unit 559 determines which filter to apply based on the metrics determined for a particular pixel or group of pixels. Using a sum-modified Laplacian value and direction as examples for Metric 1 and Metric 2 and using the mappings shown in FIG. 4A as an example, if filter unit 559 determines that a pixel or group of pixels has a sum-modified Laplacian value in Range 1-2 and a direction corresponding to Range 2-3, then filter unit 559 can apply Filter 2 to that pixel or group of pixels. If filter unit 559 determines that a pixel or group of pixels has a sum-modified Laplacian value in Range 1-4 and a direction corresponding to Range 2-2, then filter unit 559 can apply Filter 6 to that pixel or group of pixels, and so on. The filter may generally assume any type of filter support shape or arrangement. The filter support refers to the shape of the filter with respect to a given pixel being filtered, and the filter coefficients may define weighting applied to neighboring pixel values according to the filter support. According to the techniques of the present disclosure, syntax data may be included in the bitstream to signal to the decoder how the filters were encoded (e.g., how the filter coefficients were encoded), as well as the ranges of the activity metric for which the different filters should be used.

Prediction module 554 receives prediction syntax (such as motion vectors) from entropy decoding unit 552. Using the prediction syntax, prediction module 554 generates the prediction blocks that were used to code video blocks. Inverse quantization unit 556 performs inverse quantization, and inverse transform unit 558 performs inverse transforms to change the coefficients of the residual video blocks back to the pixel domain. Adder 564 combines each prediction block with the corresponding residual block output by inverse transform unit 558 in order to reconstruct the video block.

Filter unit 559 generates the filter coefficients to be applied for each input of a CU, and then applies such filter coefficients in order to filter the reconstructed video blocks of that CU. The filtering, for example, may comprise additional deblock filtering that smoothes edges and/or eliminates artifacts associated with video blocks, denoise filtering to reduce quantization noise, or any other type of filtering that can improve coding quality. The filtered video blocks are accumulated in memory 562 in order to reconstruct decoded frames (or other decodable units) of video information. The decoded units may be output from video decoder 560 for presentation to a user, but may also be stored for use in subsequent predictive decoding.

In the field of video coding, it is common to apply filtering at the encoder and decoder in order to enhance the quality of a decoded video signal. Filtering can be applied via a post-filter, in which case the filtered frame is not used for prediction of future frames. Alternatively, filtering can be applied "in-loop," in which case the filtered frame may be used to predict future frames. A desirable filter can be designed by minimizing the error between the original signal and the decoded filtered signal. Typically, such filtering has been based on applying one or more filters to a reconstructed image. For example, a deblocking filter might be applied to a reconstructed image prior to the image being stored in memory, or a deblocking filter and one additional filter might be applied to a reconstructed image prior to the image being stored in memory.

In a manner similar to the quantization of transform coefficients, the coefficients of the filter h(k,l), where k=−K, ..., K, and l=−L, ..., L may also be quantized. K and L may represent integer values. The coefficients of filter h(k,l) may be quantized as:

$$f(k,l) = \text{round}(\text{normFact} \cdot h(k,l))$$

where normFact is a normalization factor and round is the rounding operation performed to achieve quantization to a desired bit-depth. Quantization of filter coefficients may be performed by filter unit 349 of FIG. 3 during the encoding, and de-quantization or inverse quantization may be performed on decoded filter coefficients by filter unit 559 of FIG. 5. Filter h(k,l) is intended to generically represent any filter. For example, filter h(k,l) could be applied to any one of multiple inputs. In some instances multiple inputs associated with a video block will utilize different filters, in which case multiple filters similar to h(k,l) may be quantized and de-quanitzed as described above.

The quantized filter coefficients are encoded and sent from source device associated with encoder 350 to a destination device associated with decoder 560 as part of an encoded bitstream. In the example above, the value of normFact is usually equal to 2n although other values could be used. Larger values of normFact lead to more precise quantization such that the quantized filter coefficients f(k, l) provide better performance. However, larger values of normFact may produce coefficients f(k, l) that require more bits to signal to the decoder.

At decoder 560 the decoded filter coefficients f(k,l) may be applied to the appropriate input. For example, if the decoded filter coefficients are to be applied to RI, the filter coefficients may be applied to the post-deblocked reconstructed image RI(i,j), where i=0, ..., M and j=0, ..., N as follows:

$$\tilde{RI}(i,j) = \sum_{k=-K}^{K} \sum_{l=-L}^{L} f(k,l) RI(i+k, j+l) \bigg/ \sum_{k=-K}^{K} \sum_{l=-L}^{L} f(k,l)$$

The variables M, N, K and L may represent integers. K and L may define a block of pixels that spans two-dimensions from −K to K and from −L to L. Filters applied to other inputs can be applied in an analogous manner.

The techniques of this disclosure may improve the performance of a post-filter or in-loop filter, and may also reduce number of bits needed to signal filter coefficients f(k, l). In some cases, a number of different post-filters or in-loop filters are signaled to the decoder for each series of video block, e.g., for each frame, slice, portion of a frame, group of frames (GOP), or the like. For each filter, additional information is included in the bitstream to identify the CUs, macroblocks and/or pixels for which a given filter should be applied.

The frames may be identified by frame number and/or frame type (e.g., I-frames, P-frames or B-frames). I-frames refer to intra-frames that are intra-predicted. P-frames refer to predictive frames that have video blocks predicted based on one list of data (e.g., one previous frame). B-frames refer to bidirectional predictive frames that are predicted based on two lists of data (e.g., a previous and subsequent frame). Macroblocks can be identified by listing macroblock types and/or range of quantization parameter (QP) values use to reconstruct the macroblock.

Filter coefficients f(k,l), for any input, may be coded using prediction from coefficients signaled for previous CUs. For each input of a CU m (e.g., each frame, slice or GOP), the encoder may encode and transmit a set of M filters:

$$g_i^m, \text{ wherein } i=0,\ldots,M-1.$$

For each filter, the bitstream may also be encoded to identify the combination of ranges for two or more metrics for which the filter should be used.

The filter coefficients can be predicted using reconstructed filter coefficients used in a previous CU. The previous filter coefficients may be represented as:

$$f_i^n \text{ where } i=0,\ldots,N-1,$$

In this case, the number of the CU n may be used to identify one or more filters used for prediction of the current filters, and the number n may be sent to the decoder as part of the encoded bitstream. In addition, information can be encoded and transmitted to the decoder to identify combinations of ranges for two or more metrics for which predictive coding is used.

The amplitude of the filter coefficients g(k, l) depends on k and l values. Usually, the coefficient with the biggest amplitude is the coefficient g(0,0). The other coefficients which are expected to have large amplitudes are the coefficients for which value of k or l is equal to 0. This phenomenon may be utilized to further reduce amount of bits needed to signal the coefficients. The index values k and l may define locations within a known filter support.

The coefficients:

$$g_i^m(k,l), i=0,\ldots,M-1$$

for each frame m may be coded using parameterized variable length codes such as Golomb or exp-Golomb codes defined according to a parameter p. By changing the value of parameter p that defines the parameterized variable length codes, these codes can be used to efficiently represent wide range of source distributions. The distribution of coefficients g(k,l) (i.e., their likelihood to have large or small values) depends on values of k and l. Hence, to increase coding efficiency, for each frame m, the value of parameter p is transmitted for each pair (k,l). The parameter p can be used for parameterized variable length coding when encoding coefficients:

$$g_i^m(k,l) \text{ where } k=-K,\ldots,K, l=-L,\ldots,L.$$

As described above, video decoder 560 represents an example of a video decoder configured to determine a first metric for a group of pixels within a block of pixels, determine a second metric for the group of pixels, determine a filter based on the first metric and the second metric, and generate a filtered image by applying the filter to the group of pixels. Video decoder 560 also represents an example of a video encoder configured to determine a first metric for a block of pixels, wherein the first metric is determined based on a comparison of a subset of the pixels in the block to other pixels in the block; determine a second metric for the block of pixels; determine a filter based on the first metric and the second metric; and, generate a filtered image by applying the filter to the block of pixels.

As described above, video decoder 560 also represents an example of a video decoder configured to determine a mapping of range combinations to filters, wherein a range combination comprises a range for a first metric and a range for a second metric, wherein each range combination has a unique range combination identification (ID), wherein each unique range combination ID corresponds to a sequential value for a range combination; assign unique group IDs to groups of range combinations based on the sequential values for the range combinations, wherein each unique group ID corresponds to a sequential value for a group; and, code sets of filter coefficients corresponding for the filters based on the unique group IDs. Video decoder 560 can code the sets of filter coefficients by generating the sets of filter coefficients based on information received in a coded bitstream. Video decoder 560 can generate the sets of filter coefficients using differential coding techniques.

Video decoder 560 also represents an example of a video decoder configured to map a first range combination to a first filter, wherein the first range combination comprises a first range of values for a first metric and a first range of values for a second metric; map a second range combination to a second filter, wherein the second range combination comprises a second range of values for the first metric and a second range of values for the second metric; map a current range combination to a filter, wherein the current range combination comprises the first range of values of the first metric and the second range of values for the second metric. Mapping the current range combination to the filter can include mapping the current range combination to the first filter in response to receiving a first codeword, wherein the first codeword indicates the current range combination is mapped to the same filter as the first range combination; mapping the current range combination to the second filter in response to receiving a second codeword, wherein the second codeword indicates the current range combination is mapped to the same filter as the second combination; and, mapping the current range combination to a third filter in response to receiving a third codeword, wherein the third codeword identifies that third filter. Video decoder 560 also represents an example of a video decoder configured to generate a mapping of range combinations to filters, wherein a range combination comprises a range for a first metric and a range for a second metric; map a current range combination to a same filter as a previous range combination in response to receiving a first codeword signaling the current range combination is mapped to the same filter as the previous range combination; and, map the current range combination to a filter identified by a second codeword in response to receiving the second codeword signaling the current range combination is mapped to a different filter than the previous range combination.

As has been introduced above, several different types of metrics can be used in conjunction with the multi-metric filtering techniques described in this disclosure. Some of these metrics are activity metrics that quantify activity associated with one or more blocks of pixels within the video data. Activity metrics can comprise variance metrics indicative of pixel variance within a set of pixels. As will be described, some of these activity metrics are direction-specific. For example, a horizontal activity metric quantifies activity along a horizontal axis, a vertical activity metric quantifies activity along a vertical axis, a diagonal activity metric quantifies activity along a diagonal axis, and so on.

Some activity metrics are not direction-specific. For example, a sum-modified Laplacian value is an activity metric based on a two-dimensional window of pixels that surround a current pixel or current group of pixels. For a current pixel (i,j), a sum-modified Laplacian value can be calculated as follows:

$$\text{var}(i, j) = \sum_{k=-K}^{K} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l+1)| \quad (1)$$

where k represents a value of a summation of pixel values from −K to K and l represents a value of a summation from −L to L for a two-dimensional window that spans from −K to K and −L to L, wherein i and j represent pixel coordinates of the pixel data, RI(i,j) represents a given pixel value at coordinates i and j, and var(i,j) is the activity metric (i.e. the sum-modified Laplacian value).

The techniques of the present disclosure may also be implemented using direction-specific metrics for horizontal activity, vertical activity, and diagonal activity. Equations 2 and 3 show examples of how horizontal activity and vertical activity can be computed for a current pixel (x, y) by comparing a pixel value (Rec), such as intensity, of the current pixel to a pixel value of neighboring pixels.

$$\text{Hor\_act}(x,y) = R(2*\text{Rec}[x][y] - \text{Rec}[x+1][y] - \text{Rec}[x-1][y]) \quad (2)$$

$$\text{Ver\_act}(x,y) = R(2*\text{Rec}[x][y] - \text{Rec}[x][y+1] - \text{Rec}[x][y+1]) \quad (3)$$

As shown by equation 2, when determining horizontal activity, the current pixel (x,y) can be compared to a left neighbor (x−1, y) and a right neighbor (x+1, y). As shown by equation 3, when determining vertical activity, the current pixel can be compared to an upper neighbor (x, y+1) and a lower neighbor (x, y−1).

Equations 4 and 5 show examples of how diagonal activity can be computed for a current pixel (x, y) by comparing a pixel value (Rec) of the current pixel to pixel values of neighboring pixels.

$$45\text{ deg\_act}(x,y) = R(2*\text{Rec}[x][y] - \text{Rec}[x+1][y+1] - \text{Rec}[x-1][y-1]) \quad (4)$$

$$135\text{ deg\_act}(x,y) = R(2*\text{Rec}[x][y] - \text{Rec}[x-1][y+1] - \text{Rec}[x+1][y-1]) \quad (5)$$

As shown by equation 4, diagonal activity can be computed, for example, in the 45 degree direction by comparing a current pixel (x, y) to an upper-right neighbor (x+1, y+1) and a lower-left neighbor (x−1, y−1). As shown by equation 5, diagonal activity may also be in the 135 degree direction by comparing a current pixel (x, y) to a left-upper neighbor (x−1, y+1) and a right-lower neighbor (x+1, y−1).

Equations 2-5, above, illustrate how horizontal activity, vertical activity, and diagonal activity can be determined on a pixel-by-pixel basis, but in some implementations, horizontal activity, vertical activity, and diagonal activity may be determined on a group-by-group basis, where a group of pixels is a 2×2, 4×4, or M×N block of pixels. In such an implementation, horizontal activity, for example, can be determined by comparing pixel values of a current group to pixel values of a left group and a right group, in an analogous manner to equation 2; and, the vertical activity can be determined by comparing a current group to an upper group and a lower group, in an analogous manner to equation 3. Likewise, 45-degree diagonal activity can be determined by comparing a current group of pixels to an upper-right neighboring group and a lower-left neighboring group in an analogous manner to equation 4, and 135-degree diagonal activity can be determined by comparing a current group of pixels to an upper-left neighboring group and a lower-right neighboring group, in an analogous manner to equation 5.

In some implementations, horizontal activity, vertical activity, 45-degree diagonal activity, and 135-degree diagonal activity can be determined by comparing a current pixel or group of pixels to neighboring pixels or groups of pixels in only one direction. For example, instead of determining horizontal activity based on comparing a current pixel to a left neighbor and a right neighbor, horizontal activity might be determined based on only a left neighbor or only a right neighbor. Additionally, in some implementations, horizontal activity, vertical activity, 45-degree diagonal activity, and 135-degree diagonal activity may be determined using averages or weighted averages of areas of neighboring pixels instead of single neighboring pixels or single groups of pixels.

The values resulting from equations 2-5 can be divided into a finite number of ranges, such as 2, 4, 8, or any other finite number, and each range can be assigned a range identification. Referring back to FIG. 4A, for example, Range 1-1, Range 1-2, Range 2-1, etc. are all examples of range identifications. As one example, horizontal activity values can be divided into four ranges, and the ranges might be assigned IDs Range 1-1, Range 1-2, Range 1-3, and Range 1-4. Horizontal threshold values (i.e., $ThH_1, \ldots, ThH_{P-1}$) can determine where the ranges begin and end. Table 2 below shows the generic case of how horizontal IDs might be assigned to P ranges.

TABLE 2

| Index of activity metric | |
|---|---|
| Condition of Hor_act_B | Horizontal ID |
| Hor_act_B < $ThH_1$ | Range 2-1 |
| $ThH_1$ ≤ Hor_act_B < $ThH_2$ | Range 2-2 |
| ... | ... |
| $ThH_{P-1}$ ≤ Hor_act_B | Range 2-P |

Using the example of Table 2, if a current pixel has a horizontal activity value greater than $ThH_1$ but less than $ThH_2$, then the current pixel is in range 2-2 for metric 2. Current pixels may be assigned to vertical ranges with Vertical IDs, 45-degree diagonal ranges with 45-degree diagonal IDS, and 135-degree diagonal ranges with 135-degree diagonal IDs, in a similar manner as described above in Table 2 for horizontal ranges and horizontal IDs.

Any of horizontal activity, vertical activity, 45-degree diagonal activity, and 135-degree diagonal activity can be used as a metric in accordance with the multi-metric filter filtering techniques described in this disclosure. For example, referring again back to FIG. 4A, Metric 1 might be a measure of vertical activity, and Metric 2 might be a measure of horizontal activity. In such an example, a filter unit, such as filter unit 349 of FIG. 4A or filter unit 559 of FIG. 5, can determine a filter for a pixel or group of pixels based on the horizontal activity of the pixel or group of pixel and the vertical activity of the pixel or group of pixels. If, for example, a current pixel has a horizontal activity metric that falls in Range 2-3 and a vertical activity metric that falls in range 1-3, then the filter unit filters the pixel using Filter 4. In a similar manner, combinations of 45-degree diagonal activity and 135-degree diagonal activity, 45-degree diagonal activity and horizontal activity, 45-degree diagonal activity and vertical activity, 135-degree diagonal activity and horizontal activity, or 135-degree diagonal activity and vertical activity may also be used by a filter unit for selecting a filter for a pixel or group of pixels. In some implementations, three or all four of horizontal activity, vertical activity, 45-degree diagonal activity, and 135-degree diagonal activity may be used by a filter unit for selecting a filter of a pixel or group of pixels.

In the implementations described above, horizontal activity, vertical activity, 45-degree diagonal activity, and 135-degree diagonal activity can all be used as metrics, as Metric 1 and/or Metric 2 in FIG. 4A, for example. In some implementations, however, horizontal activity, vertical activity, 45-degree diagonal activity, and 135-degree diagonal activity might not be metrics themselves, but instead can be used as intermediate determinations for determining an overall direction metric. The direction metric generally describes in which direction (e.g. no direction, horizontal, vertical, 45-degree diagonal, or 135-degree diagonal) the pixels are changing the most.

In one example, using only horizontal activity and vertical activity as described in equations 2 and 3, a direction for a pixel might be determined based on the following conditions:

Direction 1=horizontal, if
  Hor_activity>$k1$*Ver_activity

Direction 2=vertical, if Ver_activity>$k2$*Hor_activity

Direction 0=no direction, otherwise.

Constants, k1 and k2, can be selected such that the direction is only deemed to be direction 1 or direction 2 if horizontal activity is substantially greater than vertical activity or vertical activity is substantially greater than horizontal activity. If horizontal activity and vertical activity are equal or approximately equal, then the direction is direction 0. Direction 1 generally indicates that the pixel values are changing more in the horizontal direction than in the vertical direction, and direction 2 indicates that pixel values are changing more in the vertical direction than in the horizontal direction. Direction 0 indicates that the change in pixel values in the horizontal direction is approximately equal to the change in pixel values in the vertical direction.

The determined direction metric (e.g. direction 0, direction 1, direction 2) can be used as a metric in the multi-metric filtering techniques described in this disclosure. Using the example of FIG. 4A again, Metric 1 might be a variance metric, such as a sum-modified Laplacian value, while Metric 2 might be a direction determination as described above. As described in reference to FIG. 4A, each of direction 1, direction 2, and direction 0 can be associated with a range of Metric 2 even though direction 1, direction 2, and direction 0 represent finite determinations instead of a spectrum of values.

In addition to using only horizontal activity and vertical activity as described above, techniques of this disclosure also include using 45-degree diagonal activity and 135-degree diagonal activity, as described in equations 4 and 5, to determine directions, based on the following conditions:

Direction=1, if 45deg_activity>$k1$*135deg_activity

Direction=2, if 135deg_activity>$k2$*45deg_activity

Direction=0, otherwise.

Direction determinations based on 45-degree diagonal activity and 135-degree diagonal activity can be used as a metric with another metric, such as a sum-modified Laplacian value, as described above.

Additionally, a direction metric may also be determined, based on the following conditions:

Direction=1, if 45deg_activity>$k1$*135deg_activity,
  $k2$*Hor_activity,AND $k3$*Ver_activity Direction=2, if 135deg_activity>>$k4$*45deg_activity,
  $k5$*Hor_activity,AND $k6$*Ver_activity Direction=3, if Hor_activity>$k7$*Ver_activity,
  $k8$*135deg_activity,AND $k9$*45deg_activity Direction=4, if Ver_activity>$k10$*Hor_activity,
  $k11$*135deg_activity,AND $k12$*45deg_activity Direction=0, otherwise.

As described above, k1 through k12 are constants selected to determine how much greater than one of horizontal activity, vertical activity, 45-degree activity, and 135-degree activity needs to be compared to the others in order for a certain direction to be selected. Direction determinations based on horizontal activity, vertical activity, 45-degree diagonal activity, and 135-degree diagonal activity can be used as a metric with another metric, such as a sum-modified Laplacian value, as described above.

Another metric that can be used with the techniques of this disclosure includes an edge metric. An edge metric generally quantifies activity that might be indicative of the presence of an edge in a block of pixels. An edge may occur, for example, in a block of pixels if that block of pixels contains the boundary of an object within an image. One example of edge detection includes using a current pixel's four neighboring pixels (e.g., left, right, top, bottom) or using the current pixel's eight neighboring pixels (left, right, top, bottom, top right, top left, bottom right, bottom left). Additionally, edge type detection may include using two neighboring pixels, such as top and bottom, left and right, top left and bottom right, or top right and left bottom.

The pseudo code below shows examples of how edge information can be computed for a current pixel (x, y) by comparing a pixel value (Rec), such as intensity, of the current pixel to the pixel values of those neighboring pixels (i.e., ⅘ pixels).

An EdgeType variable is initiated to 0. Each time a statement is true, the EdgeType variable is either incremented by 1 (as shown in the pseudo code by EdgeType ++) or decremented by 1 (as shown in the pseudo code by EdgeType −−). Rec[x][y] refers to a pixel value, such as the pixel intensity, of the pixel located at (x, y). The first grouping of "if" statements are for comparing the current pixel to top, bottom, left, and right neighbors. The second grouping of "if" statements are for comparing the current pixel to the top-left, top-right, bottom-left, and bottom-right neighbors. The techniques of this disclosure can be implemented using either group or both groups.

EdgeType=0;
if (Rec[x][y]>Rec[x−1][y]) EdgeType ++;
if (Rec[x][y]<Rec[x−1][y]) EdgeType −−;
if (Rec[x][y]>Rec[x+1][y]) EdgeType ++;
if (Rec[x][y]<Rec[x+1][y]) EdgeType −−;
if (Rec[x][y]>Rec[x][y−1]) EdgeType ++;
if (Rec[x][y]<Rec[x][y−1]) EdgeType −−;
if (Rec[x][y]>Rec[x][y+1]) EdgeType ++;
if (Rec[x][y]<Rec[x][y+1]) EdgeType −−;
if (Rec[x][y]>Rec[x−1][y−1]) EdgeType ++;
if (Rec[x][y]<Rec[x−1][y−1]) EdgeType −−;
if (Rec[x][y]>Rec[x+1][y−1]) EdgeType ++;
if (Rec[x][y]<Rec[x+1][y−1]) EdgeType −−;
if (Rec[x][y]>Rec[x−1][y+1]) EdgeType ++;
if (Rec[x][y]<Rec[x−1][y+1]) EdgeType −−;
if (Rec[x][y]>Rec[x+1][y+1]) EdgeType ++;
if (Rec[x][y]<Rec[x+1][y+1]) EdgeType −−;

If a current pixel is a local maximum, then the pixel value of the pixel will be greater than all its neighbors and will have an edge type of 4 if using four neighbors or an edge type of 8 if using eight neighbors. If a current pixel is local minimum, then the pixel value of the pixel will be less than all its neighbors and will have an edge type of −4 if using four neighbors or an edge type of −8 if using eight neighbors. Thus, using the example techniques described above for determining an edge type between −4 and 4 or −8 and 8 can be used in determining a filter. The values determined for the edge type (i.e. values of −4 to 4 or values of −8 to 8) can be mapped to ranges of a metric, such as Metric 1 or Metric 2 of FIG. 4A. In some implementations, absolute values of the edge type determination might be mapped to ranges, such that an edge type of −3 and 3, for example, would map to the same filter.

The calculations of the various metrics described in this disclosure are only intended to be examples and are not exhaustive. For example, the metrics can be determined using windows or lines of pixels that include more neighboring pixels than described in this disclosure.

Additionally, in some implementations, the metrics described in this disclosure may be calculated using sub-sampling of the pixels in a particular line or window. For example, to calculate a block activity metric for a 4×4 block of pixels, metrics for activity and direction can be calculated as follows:

Direction Metric $$\text{Ver\_act}(i,j)=\text{abs}(X(i,j)<<1-X(i,j-1)-X(i,j+1))$$

$$\text{Hor\_act}(i,j)=\text{abs}(X(i,j)<<1-X(i-1,j)-X(i+1,j))$$

$$H_B=\Sigma_{i=0,2}\Sigma_{j=0,2}\text{Hor\_act}(i,j)$$

$$V_B=\Sigma_{i=0,2}\Sigma_{j=0,2}\text{Vert\_act}(i,j)$$

$$\text{Direction}=0,1(H_B>k1*V_B),2(V_B>k2*H_B)$$

Activity Metric $$L_B=H_B+V_B$$

5 classes (0, 1, 2, 3, 4)
Metric
Combination of Activity and Direction (e.g. 15 or 16 combinations as explained above in the example of FIG. 4B)

Hor_act (i, j) generally refers to the horizontal activity of current pixel (i, j), and Vert_act(i, j) generally refers to the vertical activity of current pixel (i,j). X(i, j) generally refers to a pixel value of pixel (i, j). $H_B$ refers to the horizontal activity of the 4×4 block, which in this example is determined based on a sum of horizontal activity for pixels (0, 0), (0, 2), (2, 0), and (2, 2). $V_B$ refers to the vertical activity of the 4×4 block, which in this example is determined based on a sum of vertical activity for pixels (0, 0), (0, 2), (2, 0), and (2, 2). "<<1" represents a multiply by two operation. As explained above, based on the values of $H_B$ and $V_B$, a direction can be determined. Using the example above, if the value of $H_B$ is more than k times the value of $V_B$, then the direction can be determined to be direction 1 (i.e. horizontal), which might correspond to more horizontal activity than vertical activity. If the value of $V_B$ is more than k times the value of $H_B$, then the direction can be determined to be direction 2 (i.e. vertical), which might correspond to more vertical activity than horizontal activity. Otherwise, the direction can be determined to be direction 0 (i.e. no direction), meaning neither horizontal nor vertical activity is dominant. The labels for the various directions and the ratios used to determine the directions merely constitute one example, as other labels and ratios can also be used.

Activity ($L_B$) for the 4×4 block can be determined as a sum of the horizontal and vertical activity. The value of $L_B$ can be classified into a range, as described above. This particular example shows five ranges although more or fewer ranges may similarly be used. Based on the combination of activity and direction, a filter for the 4×4 block of pixels can be selected. As described above, a filter may be selected based on a two-dimensional mapping of activity and direction to filters, as described in reference to FIGS. 4A and 4B, or activity and direction may be combined into a single metric, and that single metric may be used to select a filter.

Figure 6A:
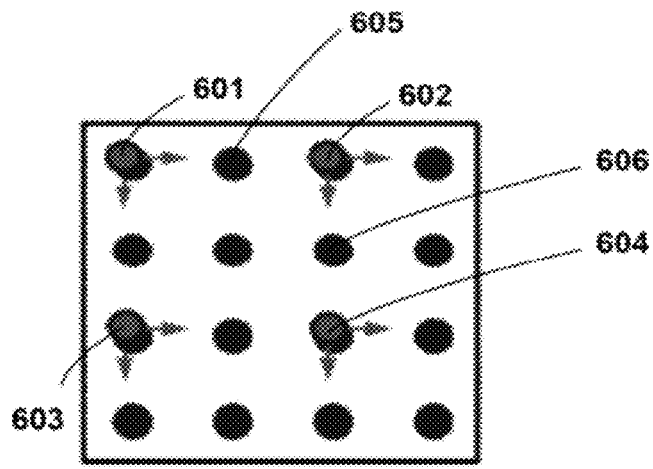
FIGS. 6A, 6B, and 6C show conceptual diagrams of a 4×4 block of pixels.

FIG. 6A represents a 4×4 block of pixels. Using the sub-sampling techniques described above, only four of the sixteen pixels are used. The four pixels are pixel (0, 0) which is labeled as pixel 601, pixel (2, 0) which is labeled as pixel 602, pixel (0, 2) which is labeled as pixel 603, and pixel (2, 2) which is labeled as pixel 604. The Horizontal activity of pixel 601 (i.e. hor_act(0, 0)), for example, is determined based on a left neighboring pixel and a right neighboring pixel. The right neighboring pixel is labeled as pixel 605. The left neighboring pixel is located in a different block than the 4×4 block and is not shown on FIG. 6A. The vertical activity of pixel 602 (i.e. ver_act(2, 0)), for example is determined based on an upper neighboring pixel and a lower neighboring pixel. The lower neighboring pixel is labeled as pixel 606, and the upper neighboring pixel is located in a different block than the 4×4 block and is not shown in FIG. 6A.

Generally using the same techniques described above, a block activity metric may also be calculated using a different subset of pixels as follows:

Direction Metric $$\text{Ver\_act}(i,j)=\text{abs}(X(i,j)<<1-X(i,j-1)-X(i,j+1))$$

$$\text{Hor\_act}(i,j)=\text{abs}(X(i,j)<<1-X(i-1,j)-X(i+1,j))$$

$$H_B=\Sigma_{i=1,2}\Sigma_{j=1,2}H(i,j)$$

$$V_B=\Sigma_{i=1,2}\Sigma_{j=1,2}V(i,j)$$

$$\text{Direction}=0,1(H>k1*V),2(V>k2*H)$$

Activity Metric $$L_B=H_B+V_B$$

5 classes (0, 1, 2, 3, 4)
Metric
Combination of Activity and Direction (e.g. 15 or 16 combinations as explained above in the example of FIG. 4B)

This different subset of pixels for calculating $H_B$ and $V_B$ includes pixels (1, 1), (2, 1), (1, 2), and (2, 2), shown on FIG.

Figure 6B:
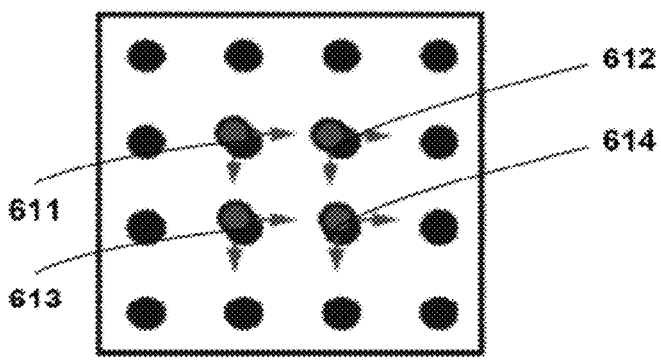
Figure 6C:
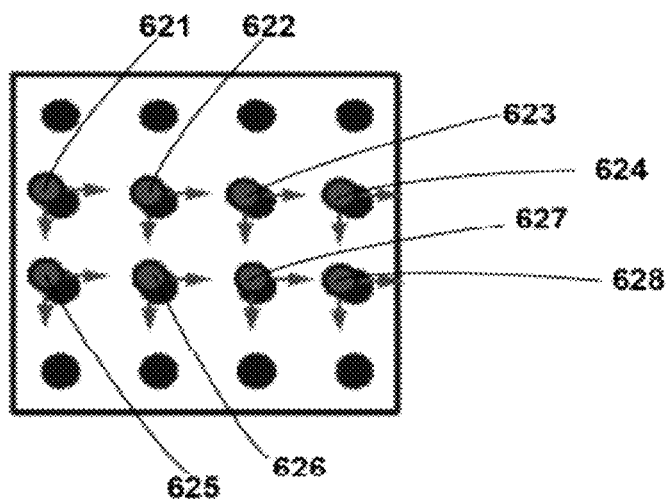

6B as pixels 611, 612, 613, and 614, respectively. As can be seen by FIG. 6B, all of the upper neighboring pixels, lower neighboring pixels, right neighboring pixels, and left neighboring pixels for pixels 611, 612, 613, and 614 are located within the 4×4 block. In the example of FIG. 6B, pixels 611, 612, 613, and 614 are all located in the interior of the block as opposed to be locating on the block boundary. Pixels 601, 602, 603, and 605 in FIG. 6A and pixels 621, 624, 625, and 628 in FIG. 6C are examples of pixels located on the block boundary. In other implementations, additional different subsets of pixel may be chosen. For example, subsets may be selected such that upper and lower neighboring pixels for the pixels of the subset are within the 4×4 block, but some left and right neighboring pixels are in neighboring blocks. Subsets may also be selected such that left and right neighboring pixels for the pixels of the subset are within the 4×4 block, but some upper and lower neighboring pixels are in neighboring blocks.

Generally using the same techniques described above, a block activity metric may also be calculated using a subset of eight pixels as follows:

Direction Metric $$\text{Ver\_act}(i,j)=\text{abs}(X(i,j)<<1-X(i,j-1)-X(i,j+1))$$

$$\text{Hor\_act}(i,j)=\text{abs}(X(i,j)<<1-X(i-1,j)-X(i+1,j))$$

$$H_B=\Sigma_{i=0,1,2,3}\Sigma_{j=1,2}H(i,j)$$

$$V_B=\Sigma_{i=0,1,2,3}\Sigma_{j=1,2}V(i,j)$$

$$\text{Direction}=0,1(H>k1*V),2(V>k2*H)$$

Activity Metric $$L_B=H_B+V_B$$

5 classes (0, 1, 2, 3, 4)

Metric

Combination of Activity and Direction (e.g. 15 or 16 combinations as explained above in the example of FIG. 4B)

This different subset of eight pixels for calculating $H_B$ and $V_B$ includes pixels (0, 1), (1, 1), (2, 1), (3, 1), (0, 2), (1, 2), (2, 2), and (3, 2), shown on FIG. 6C as pixels 621, 622, 623, and 624, 625, 626, 627, and 628 respectively. As can be seen by FIG. 6C, all of the upper neighboring pixels and lower neighboring pixels for pixels 621, 622, 623, and 624, 625, 626, 627, and 628 are located within the 4×4 block, although pixels 621 and 625 each have left neighboring pixels in a left neighboring block and pixels 624 and 628 each have right neighboring pixels in a right neighboring block. This particular selection of pixels may reduce encoder and/or decoder complexity by avoiding the need for a line buffer for storing pixel values of upper and/or lower neighboring blocks. Due to the left-to-right, top-to-bottom raster scan order, line buffers for pixel values of upper and lower neighboring blocks often need to store pixel values for the entire upper or lower line, which in the case of the 1080P video, for example, might be 1920 pixels. Line buffers for, left and right neighboring blocks, however, often only need to store pixel values for one LCU or a couple of LCUs, which might only be 64 or 128 pixels, for example. Thus, line buffers for pixel values of upper and lower neighboring blocks may need to be significantly larger than line buffers used for pixel values of left and right neighboring blocks. The selection of pixels shown in FIG. 6C may be able to avoid the use of line buffers for pixel values of upper and lower neighboring block, thus reducing coding complexity.

The examples of FIGS. 6A-6C are merely introduced techniques of this disclosure. It is contemplated that these techniques can be extended to blocks other than just 4×4 and that different subsets of pixels may be selected.

When computing a block activity metric, instead of original pixels, quantized pixels (i.e., $X(i,j)>>N$) can be used to reduce the complexity of operations, such as addition operations. Additionally, calculations can be absolute difference based instead of Laplacian based. For example, when computing Hor_act(i,j) or Ver_act(i,j), absolute differences can be used instead of Laplacian values, as follows:

Direction Metric $$\text{Ver\_act}(i,j)=\text{abs}(X(i,j)-X(i,j-1))$$

$$\text{Hor\_act}(i,j)=\text{abs}(X(i,j)-X(i-1,j))$$

$$H_B=\Sigma_{i=0,1,2}\Sigma_{j=0,1,2}H(i,j)$$

$$V_B=\Sigma_{i=0,1,2}\Sigma_{j=0,1,2}V(i,j)$$

$$\text{Direction}=0,1(H>2V),2(V>2H)$$

Activity Metric $$L_B=H_B+V_B$$

5 classes (0, 1, 2, 3, 4)

Metric

Activity+Direction (e.g. 15 or 16 combinations as explained above in the example of FIG. 4B)

This disclosure has described sub-sampling techniques with reference to a limited group of specific metrics. It is contemplated, however, that these sub-sampling techniques are generally applicable to other metrics, such as the other metrics discussed in this disclosure, that may be used for purposes of determining a filter. Additionally, although the sub-sampling techniques of this disclosure have been described with reference to 4×4 blocks of pixels, the techniques may also be applicable to blocks of other sizes.

Figure 7:
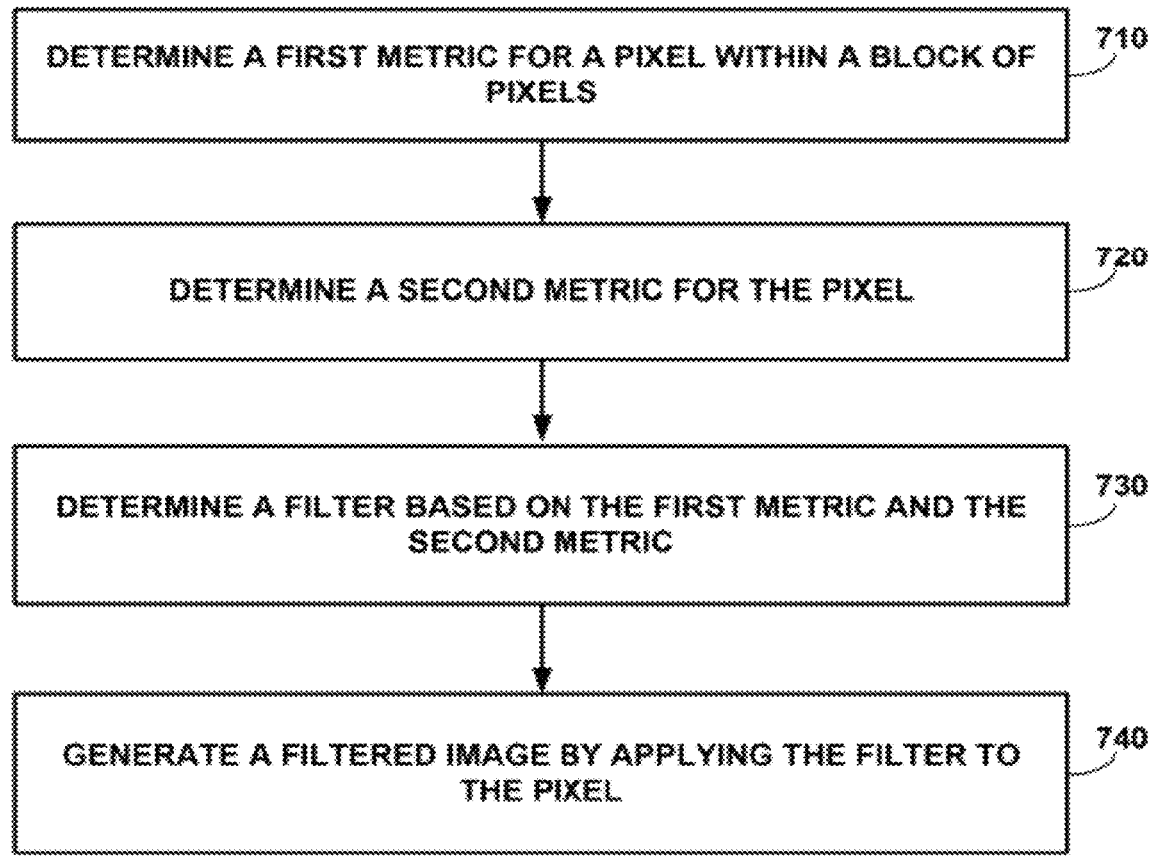
FIG. 7 is a flow diagram illustrating coding techniques consistent with this disclosure.

FIG. 7 is a flow diagram illustrating a video coding technique consistent with this disclosure. The techniques described in FIG. 7 can be performed by the filter unit of a video encoder or a video decoder, such as filter unit 349 of video encoder 350 or filter unit 559 of video decoder 560. The filter unit determines a first metric for a group of pixels within a block of pixels (710). The first metric may, for example, be an activity metric such as a sum-modified Laplacian value, or the first metric may be a direction metric. The first metric may be determined, for example, based on a comparison of the set of pixels in the block, or based on a subset of the pixels in the block, to other pixels in the block. The filter unit further determines a second metric for the block (720). The second metric may, for example, be a direction metric that is determined based on comparing a measure of horizontal activity to a measure of vertical activity. Based on the first metric and the second metric, the filter unit determines a filter (730). The filter unit generates a filtered image by applying the filter to the block (740). As discussed above, in some implementations, the block may be a 2×2, 4×4, or M×N block of pixels, used for determining the first metric or the second metric. In some implementations, the first metric may be a horizontal activity metric while the second metric is a vertical activity metric, or the first metric may be an edge metric while the second metric is a direction metric.

Figure 8A:
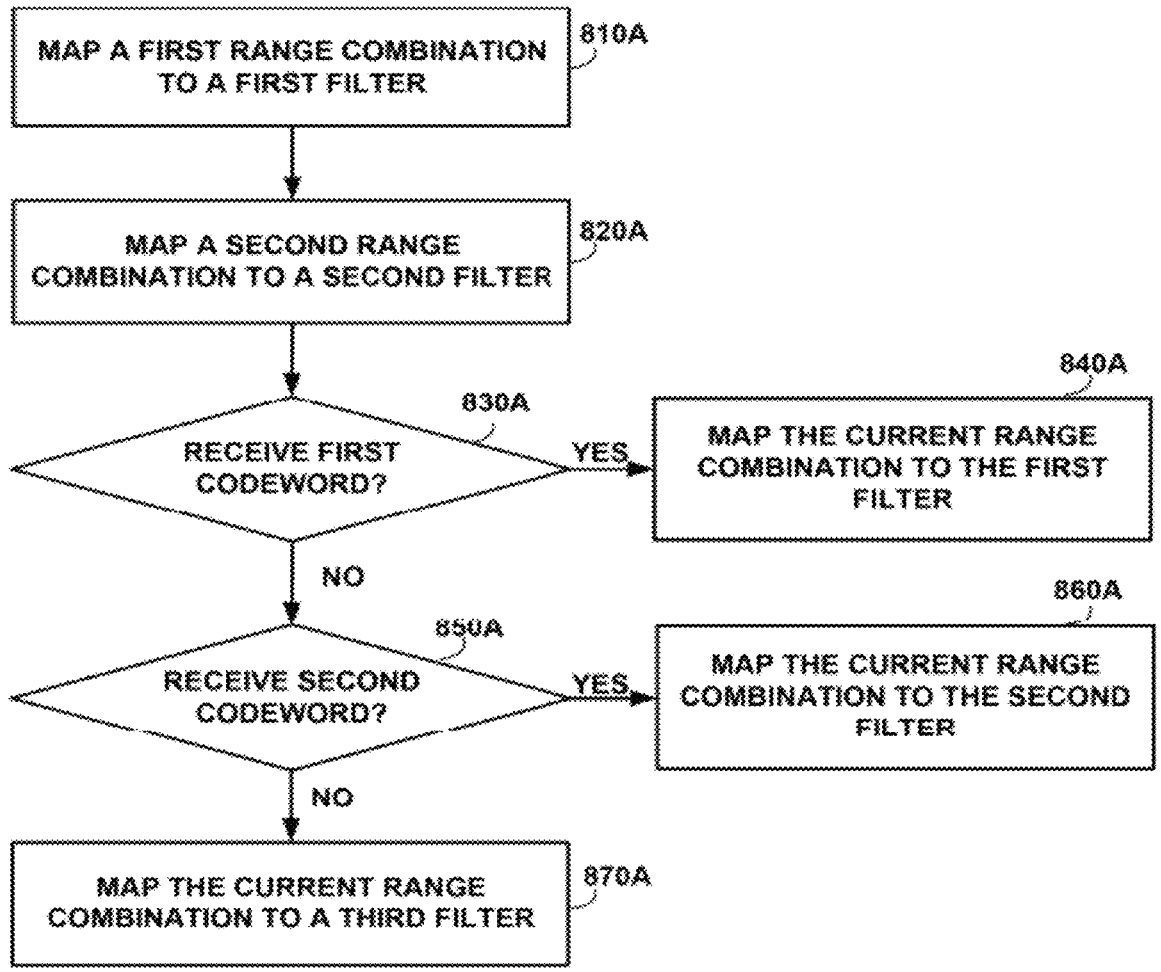
FIGS. 8A and 8B are flow diagrams illustrating coding techniques consistent with this disclosure.

FIG. 8A is a flow diagram illustrating video coding techniques consistent with this disclosure. The techniques described in FIG. 8A can be performed by the filter unit of a video decoder, such as filter unit 559 of video decoder 560. Filter unit 559 maps a first range combination to a first filter (810A). The first range combination is combination of a first range of values for a first metric and a first range of values for a second metric. The first metric may, for example, be a sum-modified Laplacian value and the second metric may be a direction metric, although others metrics may also be used. Filter unit 559 maps a second range combination to a second filter (820A). The second range combination is a combination of a second range of values for the first metric and a second range of values for the second metric. Filter unit 559 then maps a current range combination to a filter based on a received codeword. The current range combination includes the first range of values of the first metric and the second range of values for the second metric. If the codeword is a first codeword (830A, yes), then filter unit 559 maps the current range combination to the first filter (840A). The first codeword indicates the current range combination is mapped to the same filter as the first range combination. If the codeword is a second codeword (850A, yes), the filter unit 559 maps the current range combination to the second filter (860A). The second codeword indicates the current range combination is mapped to the same filter as the second combination. If the codeword is neither a first codeword nor a second codeword (850A, no), then filter unit 559 maps the current range combination to a third filter (870A). If in response to receiving a third codeword, wherein the third codeword identifies that third filter. In the example of FIG. 8A, the first codeword and the second codeword may each include fewer bits than the third codeword.

Figure 8B:
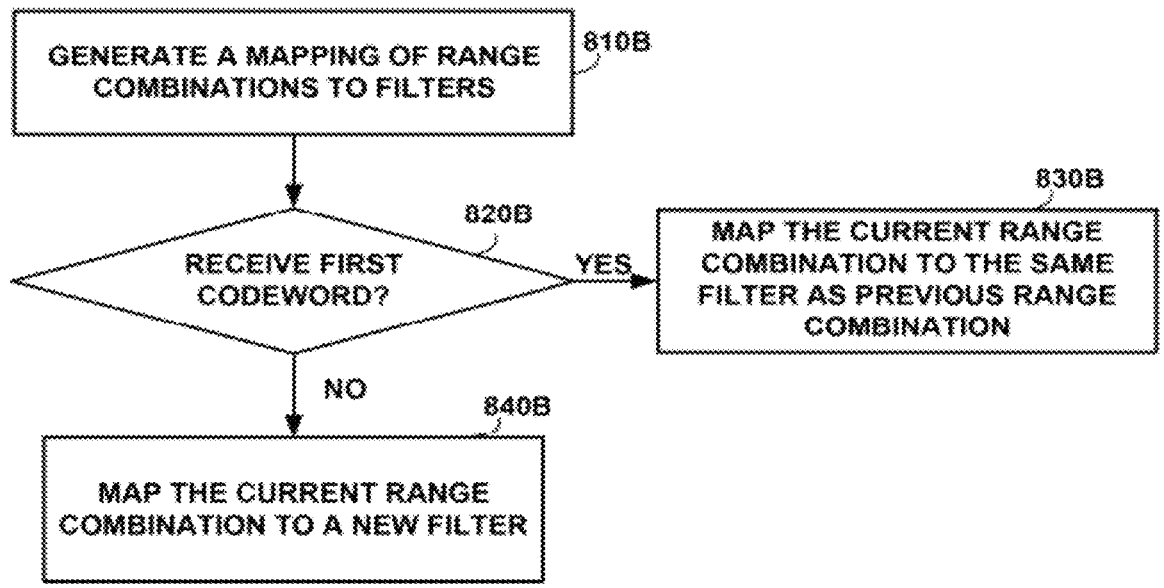

FIG. 8B is a flow diagram illustrating video coding techniques consistent with this disclosure. The techniques described in FIG. 8B can be performed by the filter unit of a video decoder, such as filter unit 559 of video decoder 560. Filter unit 559 generates a mapping of range combinations to filters (810B). Each range combination, for example, can include a range for a first metric and a range for a second metric. In response to receiving a first codeword that signals a current range combination is mapped to a same filter as a previous range combination (820B, yes), filter unit 559 maps the current range combination to the same filter as the previous range combination (830B). In response to receiving a second codeword that signals the current range combination is mapped to a different filter than the previous range combination (820B, no), filter unit 559 maps the current range combination to a new filter (840B). As described above, the current range combination can be determined based on a known transmission order. In some examples, the new filter can be identified based on the second codeword, while in other examples, the new filter might be determined based on the order in which filter coefficients are signaled.

Figure 9A:
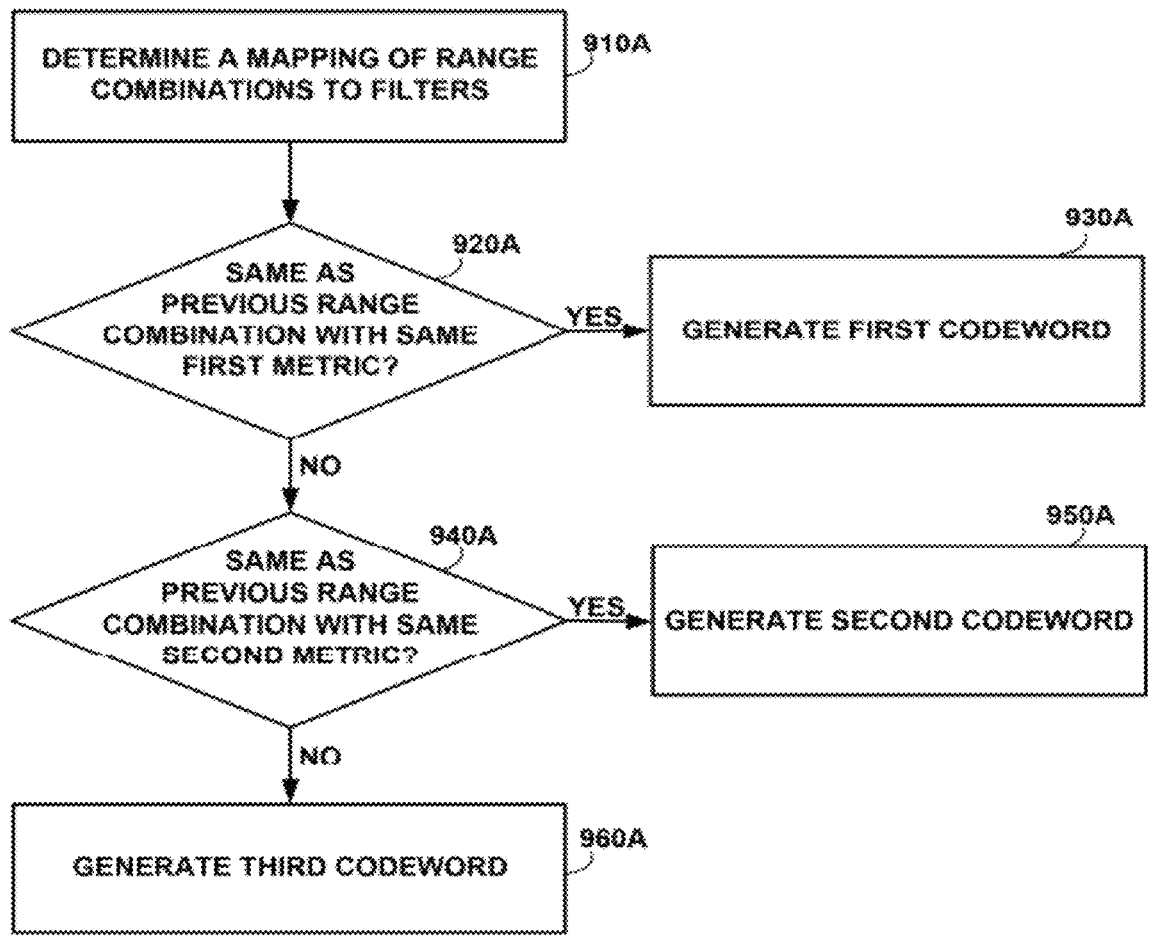
FIGS. 9A and 9B are flow diagrams illustrating coding techniques consistent with this disclosure.

FIG. 9A is a flow diagram illustrating video coding techniques consistent with this disclosure. The techniques described in FIG. 9A can be performed by the filter unit of a video encoder, such as filter unit 349 of video encoder 350. Filter unit 349 determines a mapping of range combinations to filters (910A). Each range combination includes a range of values for a first metric and a range of values for a second metric. For a current range combination, if a current range combination is mapped to the same filter as a previous range combination that comprises the same range of values for the first metric (920A, yes), then filter unit 349 generates a first codeword (930A). If the current range combination is mapped to the same filter as a previous range combination that comprises the same range of values for the second metric (940A, yes), then filter unit 349 generates a second codeword (950A). If the current range combination is not mapped to either the previous range combination that comprises the same range of values for the first metric or the previous range combination that comprises the same range of values for the second metric (950A, no), then filter unit 349 generates a third codeword (960A). The third codeword can identify a filter mapped to the current range combination.

Figure 9B:
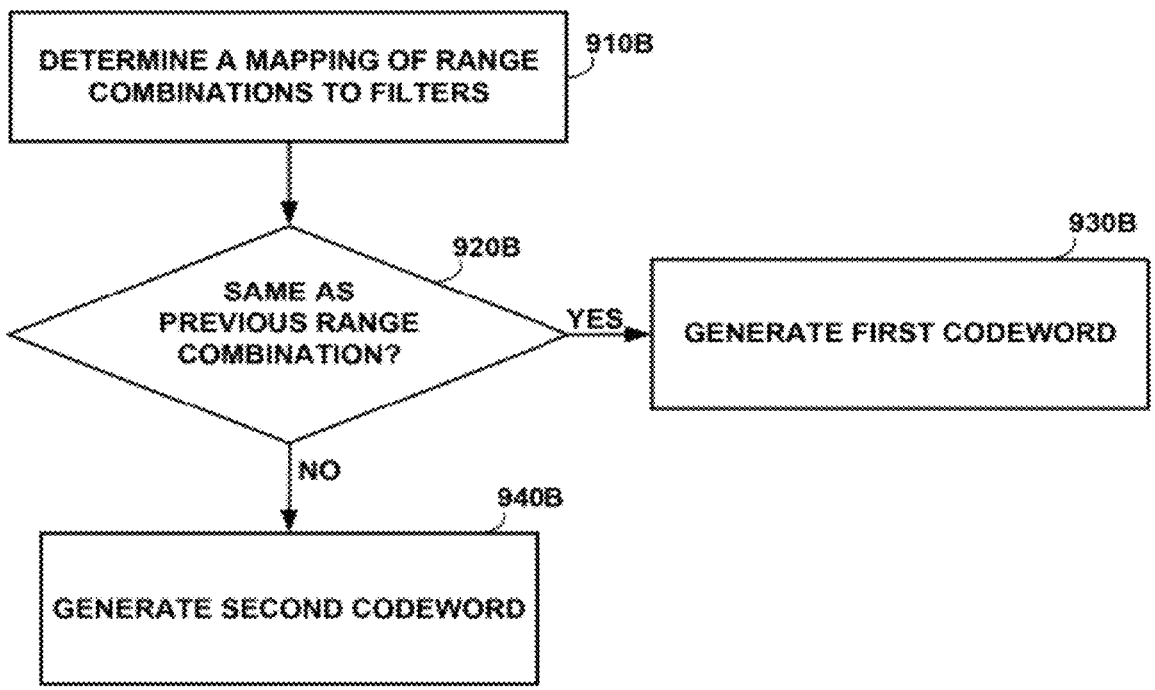

FIG. 9B is a flow diagram illustrating video coding techniques consistent with this disclosure. The techniques described in FIG. 9B can be performed by the filter unit of a video encoder, such as filter unit 349 of video encoder 350. Filter unit 349 determines a mapping of range combinations to filters (910B). Each range combination can, for example, include a range for a first metric and a range for a second metric. When a current range combination being coded has the same filter as a previously coded range combination (920B, yes), filter unit 349 can generate a first codeword to signal that the current range combination is mapped to the same filter as a previous range combination (930B). When a current range combination being coded does not have the same filter as a previously coded range combination (920B, no), filter unit 349 can generating a second codeword (940B). The second codeword can identify the filter mapped to the current range combination. As described above, the current range combination can be determined based on a known transmission order. In the example of FIG. 9B, the first codeword may include fewer bits than the second codeword.

In the examples of FIGS. 8A and 8B and FIGS. 9A and 9B, the terms "first codeword," "second codeword," and "third codeword" are used to differentiate between different codewords and not meant to imply a sequential ordering of codewords.

Figure 10:
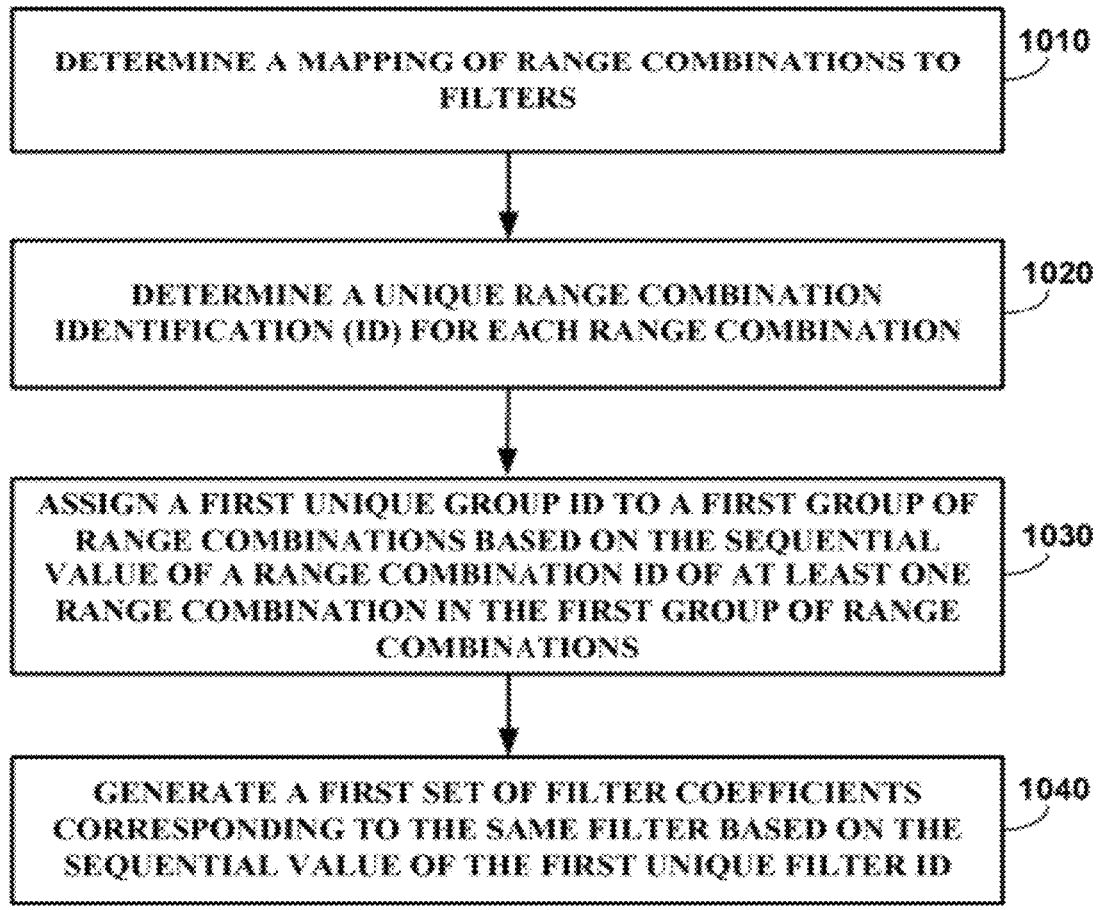
FIG. 10 is a flow diagram illustrating coding techniques consistent with this disclosure.

FIG. 10 is a flow diagram illustrating video coding techniques consistent with this disclosure. The techniques described in FIG. 10 can be performed by the filter unit of a video encoder, such as filter unit 349 of video encoder 350, or the filter unit of a video decoder, such as filter unit 559. The filter unit determines a mapping of range combinations to filters (1010). The range combinations include a range for a first metric and a range for a second metric. The filter unit determines a unique range combination identification (ID) for each range combination (1020). The unique range combination IDs correspond to sequential values. The filter unit assigns a first unique group ID to a first group of range combinations based on the sequential value of a range combination ID of at least one range combination in the first group of range combinations (1030). The groups of range combinations include range combinations mapped to the same filter, the unique group IDs correspond to a set of sequential values. The filter unit codes a first set of filter coefficients corresponding to the same filter based on the sequential value of the first unique filter ID (1040). In the case of video encoder, coding the first set of filter coefficients can include, for example, signaling the filter coefficients in an encoded bitstream using differential coding techniques. In the case of a video decoder, coding the first set of filter coefficients can include reconstructing the filter coefficients based on information received in an encoded bitstream.

Figure 11:
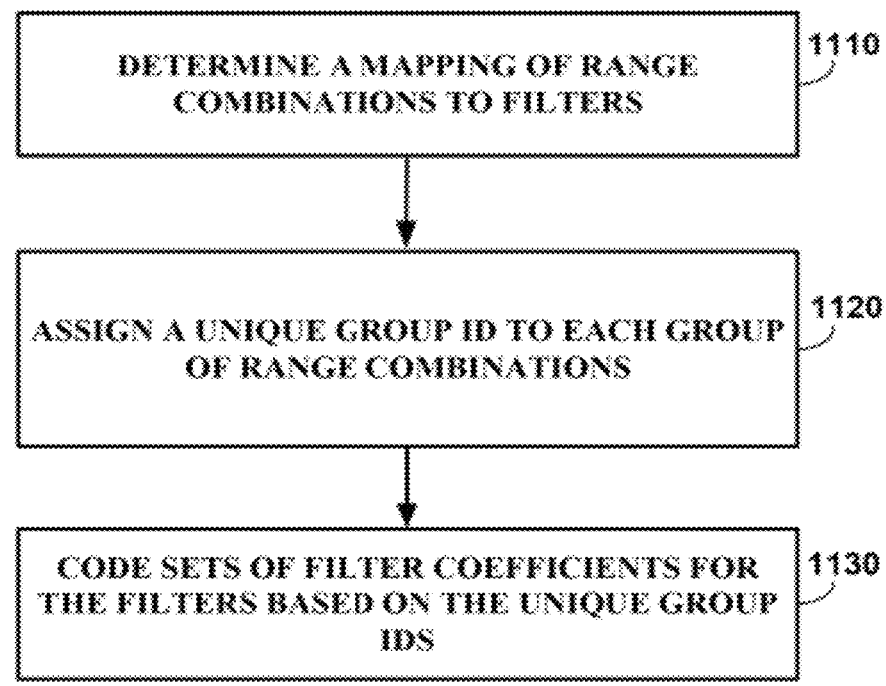
FIG. 11 is a flow diagram illustrating coding techniques consistent with this disclosure.

FIG. 11 is a flow diagram illustrating video coding techniques consistent with this disclosure. The techniques described in FIG. 11 can be performed by the filter unit of a video encoder, such as filter unit 349 of video encoder 350, or the filter unit of a video decoder, such as filter unit 559. The filter unit determines a mapping of range combinations to filters (1110). The range combinations can include a range for a first metric and a range for a second metric. Each range combination can have a unique range combination identification (ID), and each unique range combination ID can correspond to a sequential value for the range combination. The filter unit can assigns a unique group ID to each group of range combinations (1120). The filter unit can assign the unique group IDS, for example, based on the sequential values of the range combinations. A group of range combinations can includes range combinations mapped to a common filter, and the unique group IDs can correspond to a set of sequential values. The filter unit can code sets of filter coefficients for the filters based on the unique group IDs (1130).

In the example of FIG. 11, the filter unit can assign the unique group IDs by, for example, assigning a unique group ID corresponding to a lowest sequential value of the unique group IDs to a group of range combinations that comprises a range combination with a range combination ID corresponding to a lowest sequential value of the range combination IDs. In another example, the filter unit can assign the unique group ID corresponding to a highest sequential value of the unique group IDs to a group of range combinations that comprises a range combination with a range combination ID corresponding to a highest sequential value of the range combination IDs.

In instances where the filter unit is part of a video decoder, the filter unit can code the sets of filter coefficients by generating the sets of filter coefficients based on information received in a coded bitstream. The filter unit can, for example, generate the sets of filter coefficients using differential coding techniques. In instances where the filter unit is part of a video encoder, the filter unit can code the sets of filter coefficients by signaling the sets of filter coefficients in a coded bitstream in an order selected based on the sequential values of the unique group IDs. The filter unit can, for example, signal the sets of filter coefficients using differential coding techniques.

The foregoing disclosure has been simplified to some extent in order to convey details. For example, the disclosure generally describes sets of filters being signaled on a per-frame or per-slice basis, but sets of filters may also be signaled on a per-sequence basis, per-group of picture basis, per-group of slices basis, per-CU basis, per-LCU basis, or other such basis. In general, filters may be signaled for any grouping of one or more CUs. Additionally, in implementation, there may be numerous filters per input per CU, numerous coefficients per filter, and numerous different levels of variance with each of the filters being defined for a different range of variance. For example, in some cases there may be sixteen or more filters defined for each input of a CU and sixteen different ranges of variance corresponding to each filter. Additionally, when this disclosure describes transmitting filter information, it should not be assumed that all filter information is transmitted at the same coding level. For example, in some implementations, some filter information such as filter description syntax may be signaled on a frame-by-frame basis or slice-by-slice basis while other filter information such as filter coefficients are signaled on an LCU-by-LCU basis. Syntax at other levels of the coding hierarchy, such as sequence level, GOP-level, or other levels could also be defined for conveying some or all of such filter information Each of the filters for each input may include many coefficients. In one example, the filters comprise two-dimensional filters with 81 different coefficients defined for a filter support that extends in two-dimensions. However, the number of filter coefficients that are signaled for each filter may be fewer than 81 in some cases. Coefficient symmetry, for example, may be imposed such that filter coefficients in one dimension or quadrant may correspond to inverted or symmetric values relative to coefficients in other dimensions or quadrants. Coefficient symmetry may allow for 81 different coefficients to be represented by fewer coefficients, in which case the encoder and decoder may assume that inverted or mirrored values of coefficients define other coefficients. For example, the coefficients (5, −2, 10, 10, −2, 5) may be encoded and signaled as the subset of coefficients (5, −2, 10). In this case, the decoder may know that these three coefficients define the larger symmetric set of coefficients (5, −2, 10, 10, −2, 5).

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of video coding, the method comprising:
determining a direction of at least one pixel of a block of pixels;
determining a metric for the at least one pixel of the block of pixels, wherein the metric is determined based on a comparison of pixel values for a subset of the pixels in the block to the at least one pixel, wherein the block of pixels is an M×N block of pixels, and wherein at least one of M or N is 2 or greater;
based on the metric and the direction, determining a filter for the at least one pixel of the block of pixels; and
generating a filtered image by applying the filter to the at least one pixel of the block of pixels.

2. The method of claim 1, wherein the direction comprises one of a horizontal direction, a vertical direction, a 45-degree direction, or a 135-degree direction.

3. The method of claim 1, wherein determining the direction comprises comparing a measure of horizontal activity to a measure of vertical activity,
wherein the horizontal activity is determined based on comparing a pixel value of at least one pixel in the subset to a pixel value of a left neighboring pixel and a pixel value of a right neighboring pixel, and
wherein the left neighboring pixel and the right neighboring pixel are both in the block of pixels.

4. The method of claim 3, wherein the vertical activity is determined based on comparing a pixel value of at least one pixel in the subset to a pixel value of an upper neighboring pixel and a pixel value of a lower neighboring pixel, and wherein the upper neighboring pixel and the lower neighboring pixel are both in the block of pixels.

5. The method of claim 1, wherein the subset of pixels comprises pixels not on the boundary of the M×N block.

6. The method of claim 1, wherein the block of pixels is a 4×4 block of pixels including sixteen pixels, and wherein the subset of pixels includes four pixels.

7. The method of claim 1,
wherein determining the metric comprises:
comparing the at least one pixel to a first neighboring pixel of the subset of pixels;
in response to a pixel value of the at least one pixel being greater than a pixel value of the first neighboring pixel, incrementing an edge metric variable; and
in response to the pixel value of the at least one pixel being less than the pixel value of the first neighboring pixel, decrementing the edge metric variable.

8. The method of claim 7, wherein determining the metric further comprises:
comparing the at least one pixel to a second neighboring pixel of the subset of pixels;
in response to a pixel value of the at least one pixel being greater than a pixel value of the second neighboring pixel, incrementing the edge metric variable; and
in response to the pixel value of the at least one pixel being less than the pixel value of the second neighboring pixel, decrementing the edge metric variable.

9. The method of claim 1, wherein the first neighboring pixel and the second neighboring pixel comprise one of:
a left neighboring pixel and a right neighboring pixel;
a top neighboring pixel and a bottom neighboring pixel;
a bottom-left neighboring pixel and a top-right neighboring pixel; or
a top-left neighboring pixel and a bottom-right neighboring pixel.

10. The method of claim 1, wherein the method is performed by a video coding device comprising a video encoder.

11. The method of claim 1, wherein the method is performed by a video coding device comprising a video decoder.

12. A video coding device comprising:
a filter unit configured to:
determine a direction of at least one pixel of a block of pixels;
determining a metric for the at least one pixel of the block of pixels, wherein the metric is determined based on a comparison of pixel values for a subset of the pixels in the block to the at least one pixel, wherein the block of pixels is an M×N block of pixels, and wherein at least one of M or N is 2 or greater;
determine a filter for the at least one pixel of the block of pixels based on the metric and the direction; and
generate a filtered image by applying the filter to the at least one pixel of the block of pixels; and a memory configured to store a filtered result of the filter unit.

13. The video coding device of claim 12, wherein the direction comprises one of a horizontal direction, a vertical direction, a 45-degree direction, or a 135-degree direction.

14. The video coding device of claim 12, wherein the filter unit determines the direction by comparing a measure of horizontal activity to a measure of vertical activity,
wherein the horizontal activity is determined based on comparing a pixel value of at least one pixel in the subset to a pixel value of a left neighboring pixel and a pixel value of a right neighboring pixel, and
wherein the left neighboring pixel and the right neighboring pixel are both in the block of pixels.

15. The video coding device of claim 14, wherein the vertical activity is determined based on comparing a pixel value of at least one pixel in the subset to a pixel value of an upper neighboring pixel and a pixel value of a lower neighboring pixel, and wherein the upper neighboring pixel and the lower neighboring pixel are both in the block of pixels.

16. The video coding device of claim 12, wherein the subset of pixels comprises pixels not on the boundary of the M×N block.

17. The video coding device of claim 12, wherein the block of pixels is a 4×4 block of pixels including sixteen pixels, and wherein the subset of pixels includes four pixels.

18. The video coding device of claim 12, wherein the filter unit is further configured to determine the metric by:
comparing the at least one pixel to a first neighboring pixel of the subset of pixels;
in response to a pixel value of the at least one pixel being greater than a pixel value of the first neighboring pixel, incrementing an edge metric variable; and
in response to the pixel value of the at least one pixel being less than the pixel value of the first neighboring pixel, decrementing the edge metric variable.

19. The video coding device of claim 18, wherein the filter unit is further configured to determine the metric by:
comparing the at least one pixel to a second neighboring pixel of the subset of pixels;
in response to a pixel value of the at least one pixel being greater than a pixel value of the second neighboring pixel, incrementing the edge metric variable; and
in response to the pixel value of the at least one pixel being less than the pixel value of the second neighboring pixel, decrementing the edge metric variable.

20. The video coding device of claim 19, wherein the first neighboring pixel and the second neighboring pixel comprise one of:
a left neighboring pixel and a right neighboring pixel;
a top neighboring pixel and a bottom neighboring pixel;
a bottom-left neighboring pixel and a top-right neighboring pixel; or
a top-left neighboring pixel and a bottom-right neighboring pixel.

21. The video coding device of claim 12, wherein the video coding device comprises a video encoder.

22. The video coding device of claim 12, wherein the video coding device comprises a video decoder.

23. An apparatus comprising:
means for determining a direction of at least one pixel of a block of pixels;
means for determining a metric for the at least one pixel of the block of pixels, wherein the first metric is determined based on a comparison of pixel values for a subset of the pixels in the block to the at least one pixel, wherein the block of pixels is an M×N block of pixels, and wherein at least one of M or N is 2 or greater;

means for determining a filter for the at least one pixel of the block of pixels based on the metric and the direction; and means for generating a filtered image by applying the filter to the at least one pixel of the block of pixels.

24. The apparatus of claim 23, wherein the direction comprises one of a horizontal direction, a vertical direction, a 45-degree direction, or a 135-degree direction.

25. The apparatus of claim 23, wherein the means for determining the metric comprises means for comparing a measure of horizontal activity to a measure of vertical activity, wherein the means for comparing the measure of horizontal activity to the measure of vertical activity comprises means for comparing a pixel value of at least one pixel in the subset to a pixel value of a left neighboring pixel and a pixel value of a right neighboring pixel, and wherein the left neighboring pixel and the right neighboring pixel are both in the block of pixels.

26. The apparatus of claim 25, wherein the means for comparing the measure of horizontal activity to the measure of vertical activity further comprises means for comparing a pixel value of at least one pixel in the subset to a pixel value of an upper neighboring pixel and a pixel value of a lower neighboring pixel, and wherein the left neighboring pixel and the right neighboring pixel are both in the block of pixels.

27. The apparatus of claim 23, wherein the subset of pixels comprises pixels not on the boundary of the M×N block.

28. The apparatus of claim 23, wherein the block of pixels is a 4×4 block of pixels including sixteen pixels, and wherein the subset of pixels includes four pixels.

29. The apparatus of claim 23, wherein the means for determining the metric comprises:

means for comparing the at least one pixel to a first neighboring pixel of the subset of pixels;

means for incrementing an edge metric variable in response to a pixel value of the at least one pixel being greater than a pixel value of the first neighboring pixel; and means for decrementing the edge metric variable in response to the pixel value of the at least one pixel being less than the pixel value of the first neighboring pixel.

30. The apparatus of claim 29, wherein the means for determining the metric further comprises:

means for comparing the at least one pixel to a second neighboring pixel of the subset of pixels;

means for incrementing the edge metric variable in response to a pixel value of the at least one pixel being greater than a pixel value of the second neighboring pixel; and means for decrementing the edge metric variable in response to the pixel value of the at least one pixel being less than the pixel value of the second neighboring pixel.

31. The apparatus of claim 30, wherein the first neighboring pixel and the second neighboring pixel comprise one of:

a left neighboring pixel and a right neighboring pixel;

a top neighboring pixel and a bottom neighboring pixel;

a bottom-left neighboring pixel and a top-right neighboring pixel; or a top-left neighboring pixel and a bottom-right neighboring pixel.

32. The apparatus of claim 23, wherein the apparatus comprises a video encoder.

33. The apparatus of claim 23, wherein the apparatus comprises a video decoder.

34. A non-transitory, computer-readable storage medium having stored thereon instructions that when executed cause one or more processors to:

determine a direction of at least one pixel of a block of pixels;

determine a metric for the at least one pixel of the block of pixels, wherein the metric is determined based on a comparison of pixel values for a subset of the pixels in the block to the at least one pixel, wherein the block of pixels is an M×N block of pixels, and wherein at least one of M or N is 2 or greater;

determine a filter for the at least one pixel of the block of pixels based on the metric and the direction; and generate a filtered image by applying the filter to the at least one pixel of the block of pixels.

35. The non-transitory, computer-readable storage medium of claim 34, wherein the direction comprises one of a horizontal direction, a vertical direction, a 45-degree direction, and a 135-degree direction.

36. The non-transitory, computer-readable storage medium of claim 34, wherein the one more processors determine the direction by comparing a measure of horizontal activity to a measure of vertical activity and determine the horizontal activity based on comparing a pixel value of at least one pixel in the subset to a pixel value of a left neighboring pixel and a pixel value of a right neighboring pixel, and wherein the left neighboring pixel and the right neighboring pixel are both in the block of pixels.

37. The non-transitory, computer-readable storage medium of claim 36, wherein the one or more processors determine the vertical activity based on comparing a pixel value of at least one pixel in the subset to a pixel value of an upper neighboring pixel and a pixel value of a lower neighboring pixel, and wherein the upper neighboring pixel and the lower neighboring pixel are both in the block of pixels.

38. The non-transitory, computer-readable storage medium of claim 34, wherein the subset of pixels comprises pixels not on the boundary of the M×N block.

39. The non-transitory, computer-readable storage medium of claim 34, wherein the block of pixels is a 4×4 block of pixels including sixteen pixels, and wherein the subset of pixels includes four pixels.

40. The non-transitory, computer-readable storage medium of claim 34, having stored thereon additional instructions that when executed cause the one or more processors to determine the metric by:

comparing the at least one pixel to a first neighboring pixel of the subset of pixels;

in response to a pixel value of the at least one pixel being greater than a pixel value of the first neighboring pixel, incrementing an edge metric variable; and in response to the pixel value of the at least one pixel being less than the pixel value of the first neighboring pixel, decrementing the edge metric variable.

41. The non-transitory, computer-readable storage medium of claim having stored thereon additional instructions that when executed cause the one or more processors to determine the metric by:

comparing the at least one pixel to a second neighboring pixel of the subset of pixels;

in response to a pixel value of the at least one pixel being greater than a pixel value of the second neighboring pixel, incrementing the edge metric variable; and in response to the pixel value of the at least one pixel being less than the pixel value of the second neighboring pixel, decrementing the edge metric variable.

42. The non-transitory, computer-readable storage medium of claim 41, wherein the first neighboring pixel and the second neighboring pixel comprise one of:
- a left neighboring pixel and a right neighboring pixel;
- a top neighboring pixel and a bottom neighboring pixel;
- a bottom-left neighboring pixel and a top-right neighboring pixel; or
- a top-left neighboring pixel and a bottom-right neighboring pixel.

43. The non-transitory, computer-readable storage medium of claim 34, wherein the one or more processors perform video encoding.

44. The non-transitory, computer-readable storage medium of claim 34, wherein the one or more processors perform video decoding.

\* \* \* \* \*